(12) United States Patent
Jang et al.

(10) Patent No.: US 12,395,020 B2
(45) Date of Patent: Aug. 19, 2025

(54) ELECTRIC MOTOR, CLEANER HAVING SAME AND ELECTRIC MOTOR MANUFACTURING METHOD

(71) Applicant: LG Electronics Inc., Seoul (KR)

(72) Inventors: Kwangyong Jang, Seoul (KR); Yongdae Kim, Seoul (KR); Jin Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 17/926,836

(22) PCT Filed: Jan. 27, 2021

(86) PCT No.: PCT/KR2021/001055
§ 371 (c)(1),
(2) Date: Nov. 21, 2022

(87) PCT Pub. No.: WO2021/235647
PCT Pub. Date: Nov. 25, 2021

(65) Prior Publication Data
US 2023/0208214 A1    Jun. 29, 2023

(30) Foreign Application Priority Data
May 21, 2020   (KR) .................. 10-2020-0061167

(51) Int. Cl.
*H02K 1/14*      (2006.01)
*H02K 7/14*      (2006.01)
(Continued)

(52) U.S. Cl.
CPC ............. *H02K 1/148* (2013.01); *H02K 7/145* (2013.01); *H02K 15/022* (2013.01); *H02K 15/10* (2013.01)

(58) Field of Classification Search
CPC .......... H02K 1/148; H02K 1/14; H02K 3/522; H02K 1/146
See application file for complete search history.

(56) References Cited

U.S. PATENT DOCUMENTS

| | | | |
|---|---|---|---|
| 9,755,488 B2 | 9/2017 | Yu | |
| 2004/0189136 A1* | 9/2004 | Kolomeitsev | H02K 3/345 310/216.082 |

(Continued)

FOREIGN PATENT DOCUMENTS

| | | | | |
|---|---|---|---|---|
| DE | 102012022868 A1 * | 5/2014 | ............. | H02K 1/148 |
| DE | 102016219831 A1 * | 4/2017 | ............. | H02K 1/146 |

(Continued)

OTHER PUBLICATIONS

DE-102016219831-A1 Machine Translation (Year: 2017).*

(Continued)

*Primary Examiner* — Oluseye Iwarere
*Assistant Examiner* — Masoud Vaziri
(74) *Attorney, Agent, or Firm* — Fish & Richardson P.C.

(57) ABSTRACT

An electric motor includes a stator and a rotor which is rotatable with respect to the stator. The stator has: a stator core; and a stator coil which is wound around the stator core. The stator core has: a yoke which is segmented in the circumferential direction of the stator; an assembly connector which is coupled between two yokes which are continuously disposed along the circumferential direction of the stator; and teeth which protrude along the radial direction of the stator from the inner surface of the assembly connector.

13 Claims, 19 Drawing Sheets

(51) Int. Cl.
*H02K 15/022* (2025.01)
*H02K 15/10* (2006.01)

(56) References Cited

U.S. PATENT DOCUMENTS

| | | | | |
|---|---|---|---|---|
| 2018/0248419 | A1* | 8/2018 | Nigo | H02K 1/02 |
| 2019/0068009 | A1* | 2/2019 | Nakahara | H02K 15/095 |
| 2019/0149023 | A1* | 5/2019 | Weber | H02K 3/345 |
| | | | | 310/216.069 |
| 2019/0273406 | A1* | 9/2019 | Gehlert | H02K 1/20 |
| 2020/0274434 | A1* | 8/2020 | Tsuchida | A47L 9/2842 |
| 2021/0218295 | A1* | 7/2021 | Hazeyama | H02K 3/18 |

FOREIGN PATENT DOCUMENTS

| | | |
|---|---|---|
| EP | 1453188 | 3/2007 |
| JP | H07-067272 | 3/1995 |
| JP | 2000-341889 | 12/2000 |
| JP | 2004-229472 | 8/2004 |
| JP | 2004229472 A * | 8/2004 |
| JP | 4397598 | 1/2010 |
| JP | 2014-204518 | 10/2014 |
| KR | 10-2004-0077068 | 9/2004 |
| KR | 100517922 | 9/2005 |
| KR | 20090104451 | 10/2009 |
| KR | 20130043343 | 4/2013 |
| KR | 101348833 | 1/2014 |
| KR | 20190136625 | 12/2019 |

OTHER PUBLICATIONS

DE-102012022868-A1 Machine Translation (Year: 2014).*
JP-2004229472-A Machine Translation (Year: 2004).*
Office Action in Australian Appln. No. 2021277056, mailed on Aug. 9, 2023, 4 pages.
Extended European Search Report in European Appln. No. 21808959.7, mailed on May 21, 2024, 8 pages.
Office Action in Korean Appln. No. 10-2020-0061167, mailed on Jun. 16, 2024, 18 pages (with English translation).

* cited by examiner

ELECTRIC MOTOR, CLEANER HAVING SAME AND ELECTRIC MOTOR MANUFACTURING METHOD

CROSS-REFERENCE TO RELATED APPLICATIONS

This application is a National Stage application under 35 U.S.C. § 371 of International Application No. PCT/KR2021/001055, filed on Jan. 27, 2021, which claims the benefit of earlier filing date of and rights of priority to Korean Application 10-2020-0061167, filed on May 21, 2020. The disclosures of the prior applications are incorporated by reference in their entirety.

TECHNICAL FIELD

The present disclosure relates to an electric motor, a cleaner having the same, and a method of manufacturing the electric motor.

BACKGROUND ART

As is well known, an electric motor is a device that converts electrical energy into mechanical energy. Such electric motor typically includes a stator and a rotor disposed to be rotatable relative to the stator. The electric motor is manufactured in various sizes and weights depending on usage.

Among other electric motors, in an electric motor applied to a so-called handheld device that is used while being held in hand, a reduction of size and weight is a key point.

The electric motor that is applied to the handheld device, for example, a hair dryer or a cleaner is typically configured to rotate an impeller that generate suction force.

In the electric motor of the handheld device, upon manufacturing a stator, a segmented-core (or split core) that a stator core is segmented into plural parts in a circumferential direction is used in consideration of a reduction of scrap that is generated in the stator core and/or winding workability of the stator core.

However, in the related art electric motor of the handheld device, when yokes that are manufactured as a plurality of parts split in the circumferential direction of the stator core are assembled, there is a problem that coupling force is insufficient because a size of each coupling portion is relatively small.

Since the relatively small size of the coupling portion causes a coupling region of the yoke and/or tooth of the stator core to be insufficient in size, a deformation of the yoke and/or tooth may easily occur when external force is applied.

Due to this, it may be difficult to maintain concentricity of the segmented-core, which may make an air gap between the stator and the rotor non-uniform.

The non-uniform gap between the stator and the rotor causes an increase in vibration and noise.

In the related art electric motor of the handheld device, when the segmented-core is coupled, it is loosely fitted to be prevented from being deformed and an adhesive is applied to the coupling portion. This causes a limitation in preventing the decrease in concentricity due to loose-fit tolerance (assembly tolerance) of the segmented-core.

Due to this, the gap between the stator and the rotor becomes non-uniform, which causes an output of the electric motor to be lowered.

PRIOR ART LITERATURE

Patent Literature (Patent Literature 1) KR100517922 B1
(Patent Literature 2) KR101348833 B1

DISCLOSURE OF INVENTION

Technical Problem

Therefore, one aspect of the present disclosure is to provide an electric motor capable of suppressing deformation of a yoke and tooth, a cleaner having the same, and a method of manufacturing the electric motor.

Another aspect of the present disclosure is to provide an electric motor capable of maintaining a uniform gap between a stator and a rotor, a cleaner having the same, and a method of manufacturing the electric motor.

Still another aspect of the present disclosure is to provide an electric motor capable of suppressing a decrease in concentricity due to an assembly tolerance, a cleaner having the same, and a method of manufacturing the electric motor.

Still another aspect of the present disclosure is to provide an electric motor capable of suppressing an increase in magnetic reluctance due to assembling, a cleaner having the same, and a method of manufacturing the electric motor.

Still another aspect of the present disclosure is to provide an electric motor capable of improving coupling strength of a stator core, a cleaner having the same, and a method of manufacturing the electric motor.

Solution to Problem

In order to achieve those aspects and other advantages of the present disclosure, there is provided an electric motor including a stator core that may be configured by coupling assembly connectors between adjacent yokes which are split in a circumferential direction, and teeth are radially coupled to inner surfaces of the respective assembly connectors.

Specifically, the stator core may include yokes split in a circumferential direction of the stator, assembly connectors each coupled between two adjacent yokes along the circumferential direction of the stator, and teeth each protruding from an inner surface of the assembly connector along a radial direction of the stator. When coupling the yoke, the assembly connector, and the tooth, rigidity of the assembly connector to be assembled with the yoke and the tooth can be adjusted to be lower than those of the yoke and the tooth, thereby suppressing deformation of the yoke and tooth.

Here, when the assembly connector is coupled to the yoke and the tooth, the assembly connector can be coupled to the yoke and the tooth in a state of having a higher temperature by a preset difference than temperatures of the yoke and the tooth.

This can suppress the deformation of the yoke and the tooth each having a relative low temperature.

An electric motor according to an embodiment of the present disclosure may include a stator, and a rotor disposed to be rotatable with respect to the stator. The stator may include a stator core and a stator coil wound around the stator core. The stator core may include yokes split in a circumferential direction of the stator, assembly connectors each coupled between two adjacent yokes along the circumferential direction of the stator, and teeth each protruding from an inner surface of the assembly connector along a radial direction of the stator.

Here, the yoke and the tooth may be fitted to the assembly connector, respectively, with a preset interference.

This can suppress an occurrence of a decrease in concentricity of the yoke and the tooth due to tolerance at the time of loose interference-fit.

This can also increase coupling force between the yoke and the assembling connector and coupling force between the assembling connector and the tooth.

In one embodiment disclosed herein, the assembly connector may be formed of a magnetic substance.

This can prevent an increase in magnetic reluctance due to the assembly connector.

In one embodiment disclosed herein, the assembly connector may be formed by stacking a plurality of magnetic steel sheets in an insulating manner.

This can prevent an occurrence of increase in iron loss (loss of eddy current) due to the assembly connector.

In one embodiment disclosed herein, the assembly connector may have a higher temperature than the yoke and the tooth to have a preset temperature difference from the yoke and the tooth when coupling with the yoke and the tooth.

With the configuration, rigidities of the yoke and the tooth, which have relatively low temperatures, can more increase than rigidity of the assembly connector having a relatively high temperature, such that the deformation of the yoke and the tooth due to a contact with the assembly connector can be suppressed.

In one embodiment disclosed herein, the stator may include an insulator insulating the stator core and the stator coil.

Accordingly, an occurrence of a short-circuit between the stator core and the stator coil can be suppressed.

In one embodiment disclosed herein, the yoke may be provided with a protruding portion and the assembly connector may be provided with a protrusion accommodating portion in which the protruding portion is accommodated.

Accordingly, when the yoke and the assembly connector are coupled, the protrusion accommodating portion can be further expanded, compared to the protruding portion, which can facilitate the coupling between the protruding portion and the protrusion accommodating portion.

This can suppress deformation of the protruding portion and the protrusion accommodating portion.

In one embodiment disclosed herein, the protruding portion may include a first protrusion protruding in the circumferential direction of the stator core, and second protrusions protruding from the first protrusion in a radial direction of the stator core.

The protrusion accommodating portion may include a first protrusion accommodating space in which the first protrusion is accommodated, and second protrusion accommodating spaces in which the second protrusions are accommodated.

Accordingly, when the yoke and the assembly connector are coupled, a generation of a gap in the circumferential direction of the stator core and a gap in the radial direction of the stator core can be suppressed.

In one embodiment disclosed herein, a center of the first protrusion in the radial direction of the stator core may be disposed more outward than a center of an end portion of the yoke.

With this configuration, a distance (thickness) from the first protrusion accommodating space in which the first protrusion is accommodated to an inner surface of the assembly connector can increase, so that supporting strength of the assembly connector can increase.

This can result in increasing coupling force between the yoke and the assembly connector.

In one embodiment disclosed herein, an outer surface of the assembly connector may protrude more outward than an outer surface of the yoke in the radial direction of the stator core.

With this configuration, a distance (thickness) from the first protrusion accommodating space in which the first protrusion is accommodated to an outer surface of the assembly connector can increase, so that supporting strength of the assembly connector can increase.

This can result in increasing coupling force between the yoke and the assembly connector.

In one embodiment disclosed herein, an extension portion may be disposed at an inner side of an end portion of the yoke to protrude more inward than an inner surface of the assembly connector.

The extension portion of the yoke may protrude more inward than an inner diameter of the yoke.

This can increase a width of the end portion of the yoke that comes in contact with the assembly connector, thereby increasing coupling force between the assembly connector and the yoke.

In one embodiment disclosed herein, the protrusion accommodating portion may include a first protrusion accommodating space in which the first protrusion is accommodated, and second protrusion accommodating spaces in which the second protrusions are accommodated, respectively.

A distance between the second protrusion accommodating space and an outer surface of the assembly connector may be larger than a protrusion length of the second protrusion.

With this configuration, when external force is applied in the radial direction of the yoke, supporting rigidities of the first protrusion accommodating space and the second protrusion accommodating spaces can increase, thereby suppressing deformation of the first protrusion accommodating space and the second protrusion receiving spaces.

In one embodiment disclosed herein, the protruding portion may further include third protrusions protruding respectively from the second protrusions in the circumferential direction of the stator core.

Accordingly, when external force is applied in the radial direction of the stator core, the first protrusion accommodating space of the assembly connector can be restricted in the radial direction, thereby suppressing the deformation of the first protrusion accommodating space.

This can further reinforce the coupling between the yoke and the assembly connector.

In addition, the deformation of the first protrusion accommodating space in the radial direction of the stator core can be suppressed, thereby reducing wall thicknesses of the first protrusion accommodating space and the second protrusion accommodating spaces.

Accordingly, a width (radial length) of the assembly connector in the radial direction of the stator core can be reduced.

In one embodiment disclosed herein, the assembly connector may have a width that is expanded compared to a width of the tooth in the circumferential direction of the stator core.

With this configuration, when the tooth and the assembly connector are coupled, supporting force of the tooth by the assembly connector can further increase.

In addition, a length of the yoke along the circumferential direction of the stator core can be shortened by that much, so that an occurrence of transverse deformation of the yoke can be further suppressed.

Here, the tooth may be provided with extension portions respectively extending to both sides along the circumferential direction of the stator core so as to be in contact with the assembly connector.

This can increase a contact area between the assembly connector and the tooth, thereby further increasing the coupling force between the assembly connector and the tooth.

On the other hand, according to another aspect of the present disclosure, there is provided a cleaner that may include a cleaner main body having an air passage defined therein and provided with a handle on one side, an impeller disposed inside the cleaner main body, and the electric motor disposed inside the cleaner main body and rotating the impeller.

In the electric motor, since deformation of a yoke and a tooth can be suppressed, a uniform air gap between a stator and a rotor can be maintained.

Here, a suction part may be provided on one side of the air passage and a discharge part may be provided on another side of the air passage.

Accordingly, when the impeller is driven by the electric motor, external air is suctioned through the suction part, flows along the air passage, and is discharged to outside through the discharge part.

In addition, a foreign material separation part may be disposed in the cleaner main body to separate foreign materials in air that flows along the air passage from the air.

Accordingly, foreign materials that are separated by the foreign material separation part from the air suctioned through the suction part can be discharged to the outside of the cleaner main body through the discharge part.

In one embodiment disclosed herein, the cleaner main body is further provided with a battery for supplying power to the electric motor.

Accordingly, since the cleaner main body is driven by receiving power from the battery, cleaning can be performed without being connected to commercial power.

The electric motor can rotate at a high speed and size and weight of the electric motor can be reduced, so that the cleaner main body can be easily handled.

According to still another aspect of the present disclosure, there is provided a method for manufacturing an electric motor that includes a stator, a rotor disposed to be rotatable with respect to the stator, wherein the stator comprises a stator core including yokes split in a circumferential direction of the stator, assembly connectors each coupled between two continuous yokes along the circumferential direction of the stator, and teeth each protruding from an inner surface of the assembly connector along a radial direction of the stator, and a stator coil wound on the stator core. The method may include forming the yoke, the assembly connector, and the tooth, respectively, winding the stator coil on the tooth, coupling the yoke to the assembly connector, and coupling the tooth to the assembly connector.

Here, in the steps of coupling the yoke to the assembly connector and coupling the tooth to the assembling connector, interference-fit with a preset interference may be made between the yoke and the assembly connector and between the tooth and the assembly connector.

In one embodiment disclosed herein, the method may further include, before winding the stator coil on the tooth, insulating the tooth and the stator coil.

In one embodiment disclosed herein, the method may further include, before the step of insulating the tooth and the stator coil, providing an insulator between the teeth and the stator coil.

In one embodiment disclosed herein, the method may further include, before the steps of coupling the yoke to the assembly connector and coupling the tooth to the assembly connector, adjusting temperatures of the yoke, the tooth, and the assembly connector such that the assembly connector has a preset temperature difference from the yoke and the tooth.

Here, in the step of adjusting the temperatures of the yoke, the tooth, and the assembly connector, the assembly connector may be heated to a preset temperature.

Advantageous Effects of Invention

As described above, according to one embodiment of the present disclosure, the stator core may include the yokes split along the circumferential direction, the assembly connectors each coupled between two adjacent yokes, and the teeth each coupled to the inner side of the assembly connector, thereby suppressing deformation of the yokes and the teeth.

This can maintain a uniform air gap between the stator and the rotor, and suppress a decrease in output of the electric motor due to a non-uniform air gap.

As the circumferential length of the yoke is shortened by the length of the assembly connector along the circumferential direction of the stator core, an occurrence of radial (transverse) deformation of the yoke can be suppressed.

By fitting the yoke and/or the tooth to the assembling connector with a preset interference, a decrease in concentricity of the yoke and the tooth due to an assembly tolerance can be suppressed.

By suppressing a generation of a gap in a coupling region of the yoke, the assembly connector, and the tooth, an increase in magnetic reluctance can be suppressed.

Since the assembly connector is formed by stacking magnetic steel sheets in an insulating manner, an increase in magnetic reluctance can be suppressed.

In addition, when the assembly connector is coupled with the yoke and/or the tooth, the assembly connector is controlled to have a higher temperature by a preset temperature difference than the yoke and the tooth, thereby effectively suppressing the deformation of the yoke and the tooth during coupling.

In addition, the yoke has the protruding portion and the assembly connector has the protrusion accommodating portion in which the protruding portion is accommodated. Accordingly, when the yoke and the assembly connector are coupled, deformation of the yoke can be effectively suppressed.

In addition, since the center of the first protrusion along the radial direction of the stator core is located more outward than the center of the yoke, a thickness of an outer wall (inner outer wall) of the first protrusion accommodating space for accommodating the first protrusion can increase. This can result in reinforcing coupling force between the yoke and the assembly connector.

In addition, since the outer surface of the assembly connector along the radial direction of the stator core protrudes more outward than the outer surface of the yoke, the thickness of an outer wall (outer wall of an outer side) of the first protrusion accommodating space for accommodating the first protrusion can increase. This can further reinforce the coupling force between the yoke and the assembly connector.

In addition, since the protruding portion is provided with the third protrusions protruding from the second protrusions along the circumferential direction of the stator core, the coupling force between the yoke and the assembly connector can be further reinforced.

Since the assembly connector has the width that is expanded more than the width of the tooth in the circumferential direction of the stator core, the coupling force among the yoke, the assembly connector, and the tooth can be reinforced.

In addition, since the tooth is provided with the extension portions respectively extending to both sides along the circumferential direction of the stator core to be in contact with the assembly connector, the coupling force between the tooth and the assembly connector can be reinforced.

MODE FOR THE INVENTION

Figure 1:
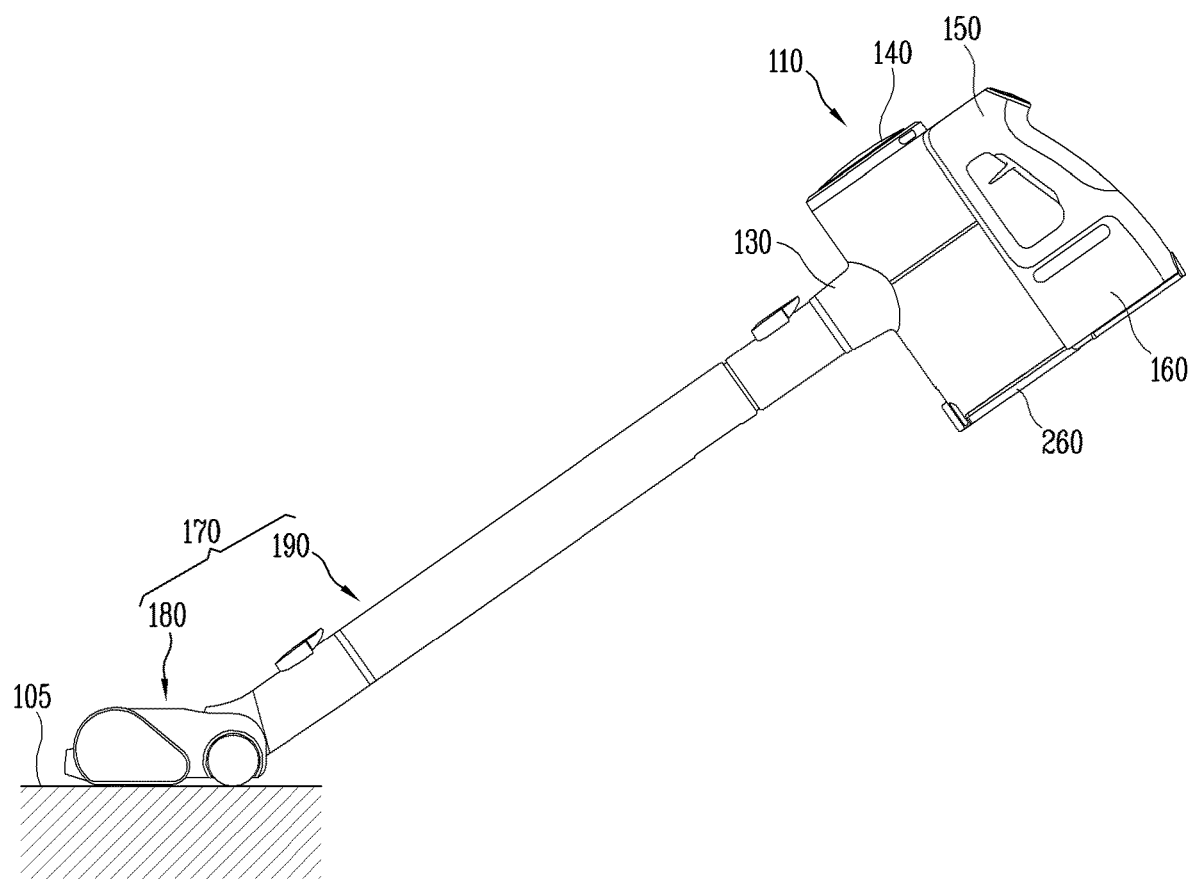
FIG. 1 is a perspective view illustrating a cleaner having an electric motor in accordance with one embodiment.

Hereinafter, implementations of the present disclosure will be described in detail with reference to the accompanying drawings. For the sake of brief description with reference to the drawings, the same or equivalent components will be provided with the same reference numerals, and description thereof will not be repeated. A singular representation used herein may include a plural representation unless it represents a definitely different meaning from the context. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 2:
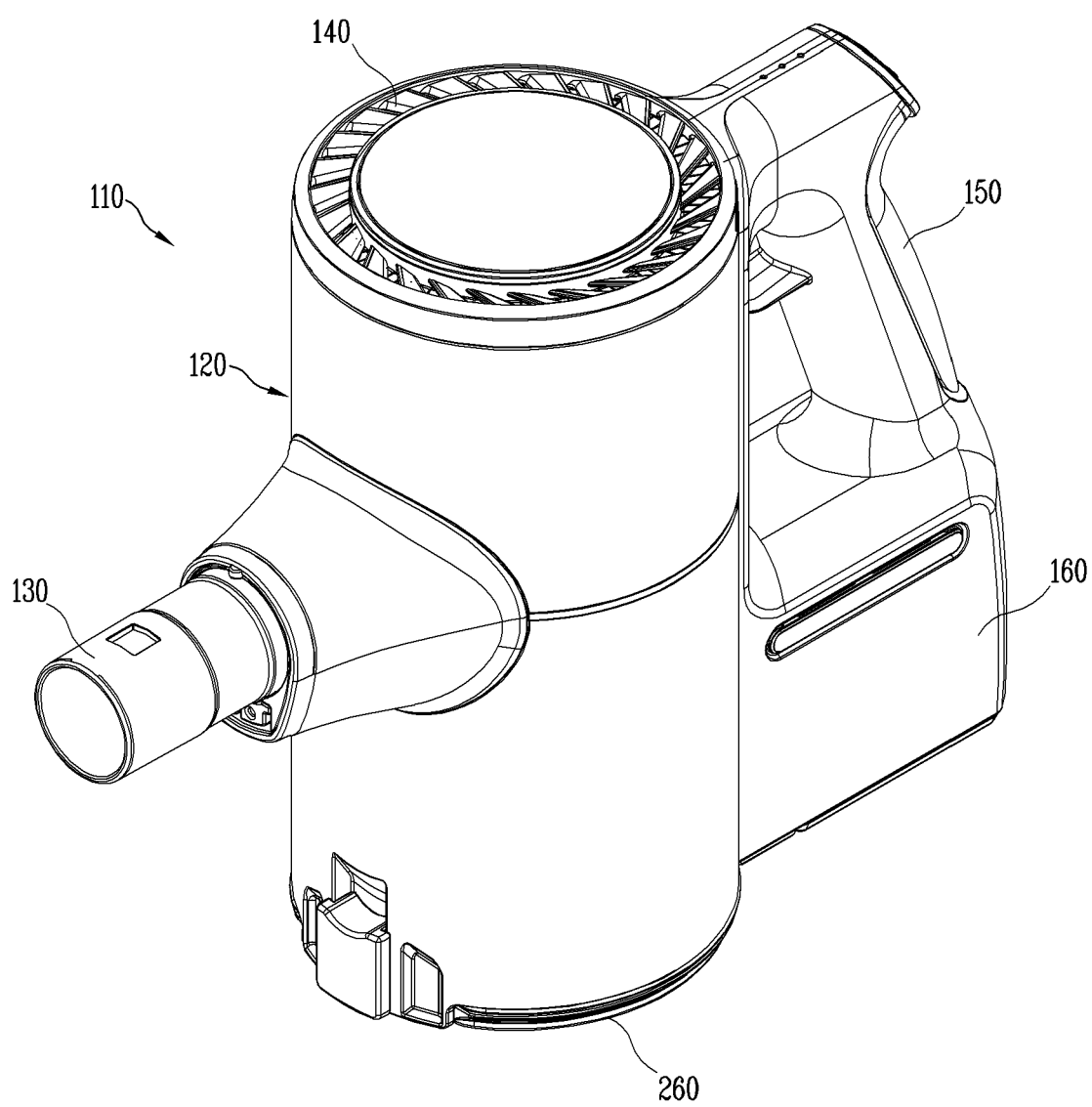
FIG. 2 is a perspective view illustrating a cleaner main body of FIG. 1.
Figure 3:
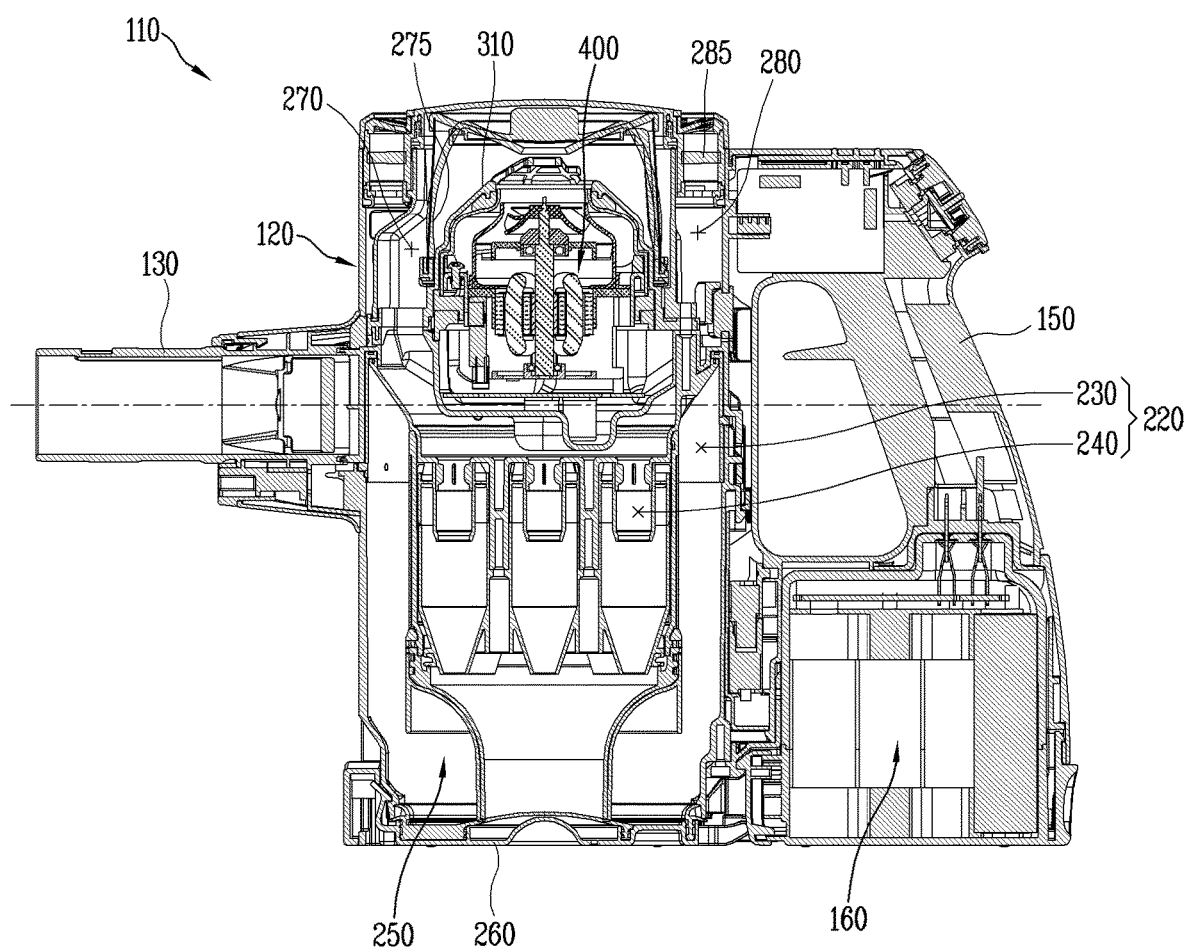
FIG. 3 is a sectional view of FIG. 2.

FIG. 1 is a perspective view illustrating a cleaner having an electric motor in accordance with one embodiment, FIG. 2 is a perspective view illustrating a cleaner main body of FIG. 1, and FIG. 3 is a sectional view of FIG. 2. As illustrated in FIGS. 1 and 2, a cleaner according to an embodiment of the present disclosure includes a cleaner main body 110.

The cleaner main body 110 includes a body 120 having a substantially cylindrical shape. A cylindrical accommodation space may be defined inside the body 120.

A suction part 130 through which external air is suctioned into the cleaner main body 110 (or body 120) is disposed on one side of the cleaner main body 110. The suction part 130 is located, for example, at a front region of the cleaner main body 110.

A discharge part 140 through which internal air is discharged is disposed on another side of the cleaner main body 110. The discharge part 140 is located, for example, at an upper end of the cleaner main body 110.

An air movement path (air passage) through which air suctioned through the suction part 130 moves to the discharge part 140 is defined in the cleaner main body 110.

The suction part 130 is provided with a suction unit 170 for suctioning foreign materials together with air. The suction unit 170, for example, may be detachably coupled to the suction part 130.

The suction unit 170 includes, for example, a suction head 180 brought into contact with a target surface to be cleaned (e.g., bottom surface or floor) 105, and a connection pipe 190 having one side connected to the suction head 180 and another side connected to the suction part 130. Although not illustrated, the suction unit 170 may include a suction nozzle detachably coupled to the suction part 130.

A movement passage through which air and foreign materials can move is defined inside the connection pipe 190. The connection pipe 190 is detachably coupled to the suction part 130. The suction head 180 is detachably coupled to the connection pipe 190. A suction port (not illustrated) through which air and foreign materials can be suctioned is disposed in a lower portion of the suction head 180.

The cleaner main body 110 is provided with a handle 150 to be gripped. The handle 150 may be provided, for example, on a rear region of the cleaner main body 110 (the body 120). The cleaner main body 110 is provided with a battery 160 for supplying power. The battery 160 is, for example, provided at one side (lower side in the drawing) of the handle 150. The battery 160 may be disposed in a rear lower region of the cleaner main body 110, for example.

As illustrated in FIG. 3, an impeller 210 for generating suction force is provided inside the cleaner main body 110 (the body 120). An electric motor 400 for rotating the impeller 210 is provided at one side (a lower side in the drawing) of the impeller 210.

A suction passage 270 is defined outside the impeller 210. A discharge passage 280 is defined at one side outside the electric motor 400. A filter 275 for collecting foreign materials in the air may be disposed, for example, in the suction passage 270. A filter (e.g., a high efficiency particulate air (HEPA) filter) 285 for collecting fine dust in the air is provided in the discharge passage 280.

A foreign material separation part 220 is disposed inside the cleaner main body 110 to separate foreign materials moving together with air from the air.

The foreign material separation part 220 may be defined below the electric motor 400.

The foreign material separation part 220, for example, may include a first cyclone unit 230 that is capable of separating foreign materials by a cyclonic flow. The first cyclone unit 230 communicates with the suction part 130. Air and foreign materials suctioned through the suction part 130 are separated from each other while making a so-called cyclonic flow spirally along an inner circumferential surface of the first cyclone unit 230.

The foreign material separation part 220 may further include, for example, a second cyclone unit 240 that separates air and foreign materials by a cyclonic flow. The second cyclone unit 240 may, for example, be implemented have a smaller size than the first cyclone unit 230. The first cyclone unit 230 may be disposed at an inner side of the first cyclone unit 230. The second cyclone unit 240 may be provided in plurality that are disposed in parallel inside the body 120. The second cyclone unit 240 may be, for example, disposed at the inner side of the first cyclone unit 230 in the circumferential direction.

A foreign material collecting unit 250 is disposed in a lower portion of the cleaner main body 110. Foreign materials that are separated from air by the first cyclone unit 230 and the second cyclone unit 240 are collected in the foreign material collecting unit 250.

A discharge cover 260 through which foreign materials collected can be thrown away is disposed on the lower portion of the cleaner main body 110. The discharge cover 260 is configured to open and close a lower opening of the cleaner main body 110. The discharge cover 260 may, for example, be open and closed by rotating in a vertical direction centering on one side of the lower portion of the cleaner main body 110 (the body 120).

With this configuration, when the impeller 210 is driven, air is introduced into the cleaner main body 110 through the suction part 130. The air introduced into the cleaner main body 110 makes a cyclonic flow that the air flows spirally along the inner circumferential surface of the body 120 in the first cyclone unit 230, such that foreign materials in the air are primarily separated from the air. The separated foreign materials are collected in a lower side of the first cyclone unit 230.

The air that has passed through the first cyclone unit 230 makes the cyclonic flow in the second cyclone unit 240, so that foreign materials are secondarily separated from the air. The secondarily-separated foreign materials are collected in a lower side of the second cyclone unit 240. The secondarily-separated foreign materials are collected in an inner space of the foreign materials which have been collected in an annular shape in the lower side of the first cyclone unit 230.

The air that has passed through the second cyclone unit 240 moves to the suction passage 270. The air passes through the filter 275 of the suction passage 270 and moves to the electric motor 400 through the impeller 210. The air that has passed through the electric motor 400 moves to the discharge passage 280. The air that has passed through the HEPA filter 285 of the discharge passage 280 is discharged to an upper side of the cleaner main body 110 through the discharge part 140.

Figure 4:
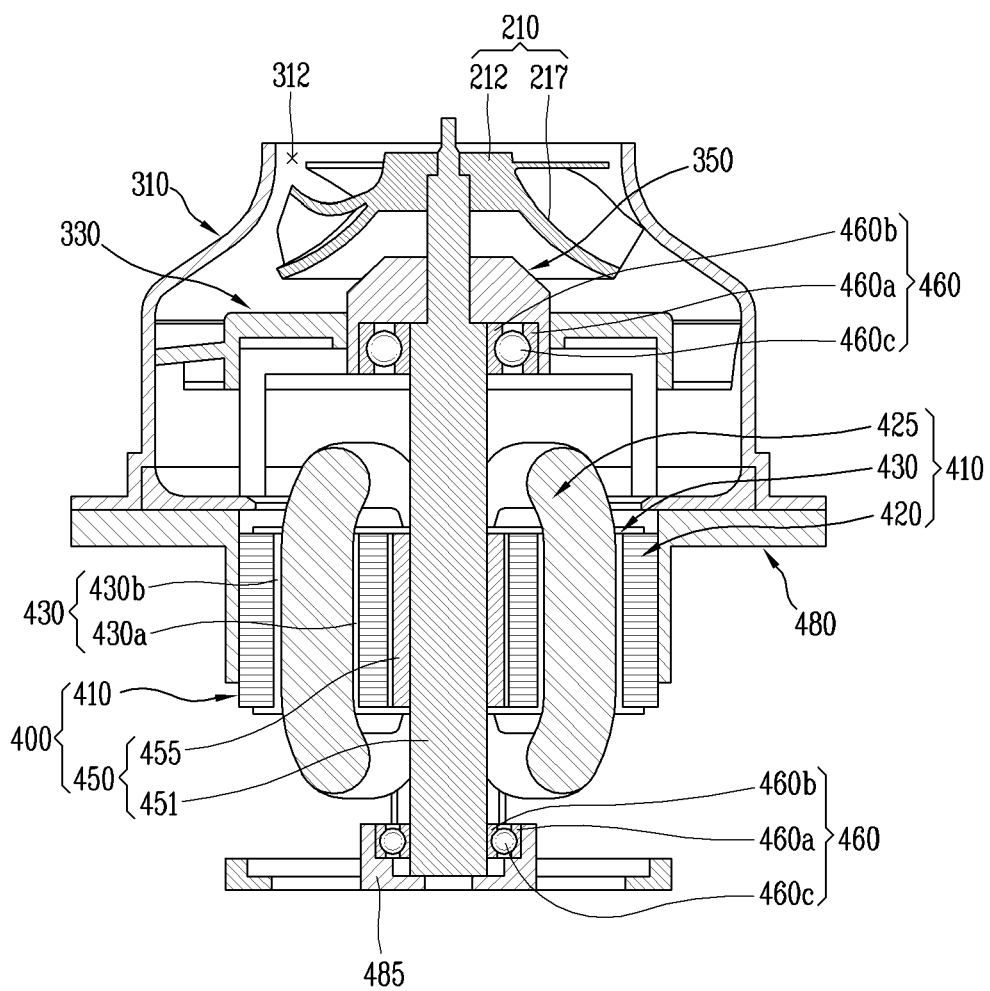
FIG. 4 is an enlarged view illustrating an electric motor of FIG. 3.
Figure 5:
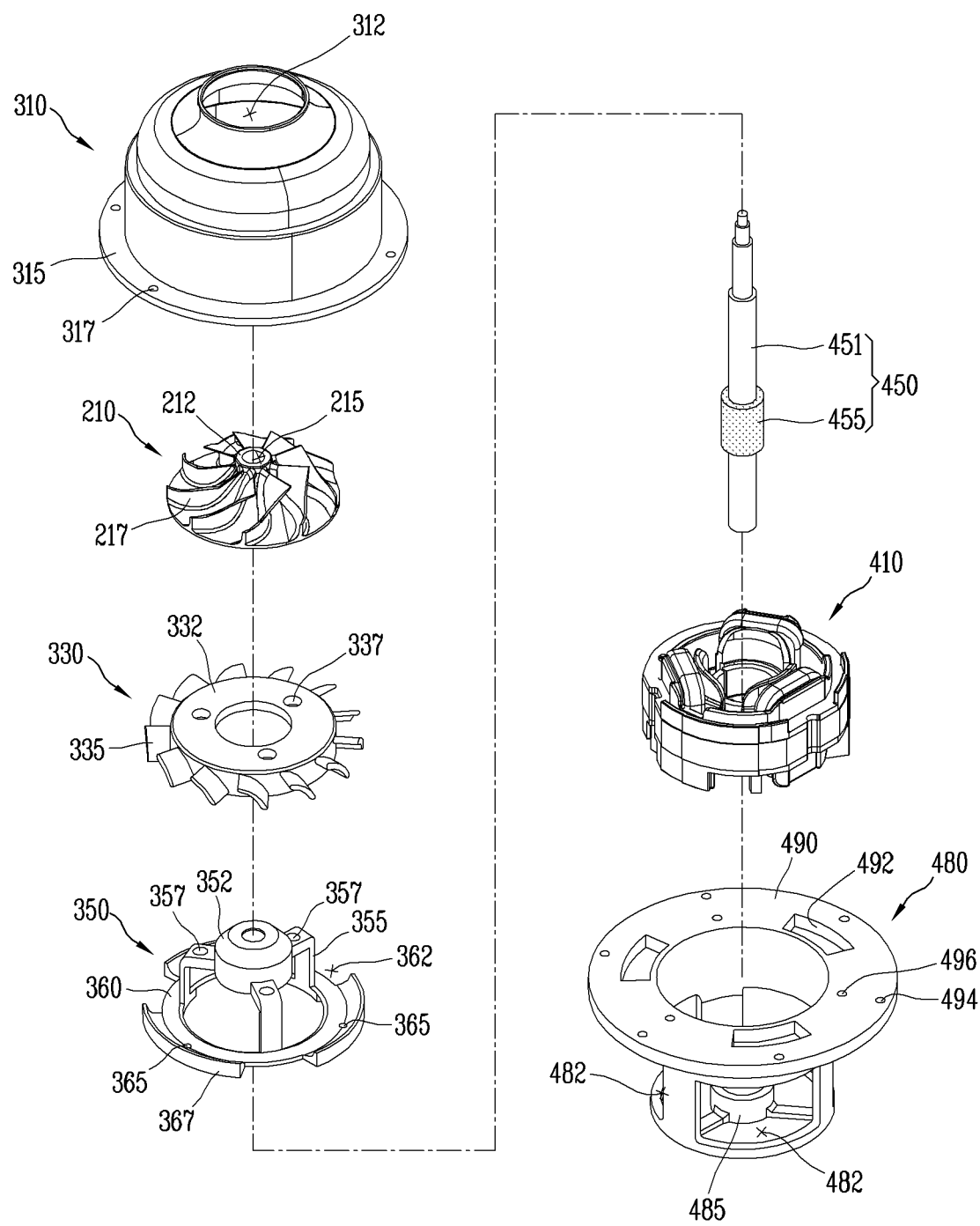
FIG. 5 is an exploded perspective view of the electric motor of FIG. 4.

FIG. 4 is an enlarged view illustrating an electric motor of FIG. 3, and FIG. 5 is an exploded perspective view of the electric motor of FIG. 4. As illustrated in FIGS. 4 and 5, the electric motor 400 includes an impeller 210, a stator 410, and a rotor 450.

The impeller 210 includes a hub 212 and a plurality of blades 217 disposed along a circumference of the hub 212. A rotating shaft coupling portion 215 to which one end portion (upper end portion in the drawing) of a rotating shaft 451 of the electric motor 400 is to be coupled is formed on the hub 212.

An inlet body 310 (impeller housing) is disposed at an outside of the impeller 210. A suction port 312 is disposed on one end (upper end in the drawing) of the inlet body 310. A flange 315 extends in a radial direction from another end (lower end of the drawing) of the inlet body 310. A plurality of fastening member coupling portions 317 to which fastening members are to be coupled are formed in the flange 315 of the inlet body 310.

A diffuser 330 is disposed at one side (lower side in the drawing) of the impeller 210 in an axial direction. The impeller 330 includes a body 332, and a plurality of vanes 335 disposed on a circumference of the body 332. The body 332 has a cylindrical shape. A through portion is formed through a center of the body 332. A bearing housing 352 to be described later is accommodated in the center of the body 332. A plurality of fastening member coupling portions 337 to which a plurality of fastening members are to be coupled are disposed in the body 332 of the diffuser 330.

A bearing support unit 350 is disposed at one side (lower side in the drawing) of the diffuser 330 in the axial direction. The bearing support unit 350 includes a bearing housing 352 to which a bearing 460 is received, a plurality of support rods 355 each having one end coupled to an outer surface of the bearing housing 352, and a support plate 360 in a ring shape to which another end of each of the plurality of support rods 355 is coupled. The support plate 360 has a circular ring shape. The support plate 360 is provided with a plurality of through portions 362 formed therethrough such that air passed through the diffuser 330 can move.

The support plate 360 is provided with side support portions 367 bent in the axial direction between the adjacent through portions 362 along the circumferential direction. A fastening member insertion portion 365 may be formed through the support plate 360 such that the support plate 360 can be coupled to a housing 480 to be explained later by a fastening member. The plurality of support rods 355 may be, for example, three in number. Each of the plurality of support rods 355 includes a horizontal section extending radially from the bearing housing 352, and a vertical section bent from the horizontal section to be arranged in the axial direction so as to be connected to the support plate 360. A fastening member coupling portion 357 is disposed in the horizontal section of the support rod 355 so that the body 332 of the diffuser 330 can be fastened thereto by a fastening member.

The electric motor 400 includes, for example, a stator 410 and a rotor 450 disposed to be rotatable relative to the stator 410. The electric motor 400 of this embodiment is configured to be rotatable at a high speed. The electric motor 400 of this embodiment is configured to be rotatable at 160 to 200 krpm, for example.

The rotor 450 includes, for example, a rotating shaft 451 and a permanent magnet 455 rotating centering on the rotating shaft 451. The permanent magnet 455 is implemented in a cylindrical shape having a rotating shaft hole formed through its center such that the rotating shaft 451 is inserted therethrough. The permanent magnet 455 has alternately different magnetic poles (N pole and S pole) along the circumferential direction. The permanent magnet 455 may be configured to protrude (overhang), for example, to both sides of the stator core 420 by preset lengths in the axial direction. In this embodiment, the permanent magnet 455 of the rotor 450 may protrude from both ends of the stator core 420 in the axial direction, respectively, by the preset lengths, for example, 0.60 mm.

The rotating shaft 451 extends, for example, to both sides of the rotor 450.

One end portion (an upper end portion in the drawing) of the rotating shaft 451 is coupled to the impeller 210.

The rotating shaft 451 may be rotatably supported, for example, by bearings 460 that are disposed on both sides (upper and lower sides in the drawing) of the rotor 450. Each of the bearings 460 may include, for example, an outer ring 460a, an inner ring 460b concentrically disposed at an inner side of the outer ring 301, and a plurality of balls 460c disposed between the outer ring 460a and the inner ring 460b. The embodiment illustrates that the bearing 460 is implemented as a ball bearing. However, this is merely illustrative and the present disclosure is not limited thereto. The bearing 460 may alternatively be implemented as a gas bearing, for example.

The stator 410, for example, includes a stator core 420, a stator coil 425 wound around the stator core 420, and an insulator 430 disposed to insulate between the stator core 420 and the stator coil 425. The insulator 430 may be disposed between the stator core 420 and the stator coil 425, for example. The insulator 430 includes, for example, a tooth insulating portion 430a that insulates between a tooth 530 and the stator coil 425. The tooth insulating portion 430a is configured to surround a peripheral surface (an upper surface, a lower surface, and both side surfaces in the drawing) of the tooth 530. The stator coil 425 is wound along the periphery of the tooth insulating portion 430a. The insulator 430 includes, for example, a yoke insulating portion 430b that insulates between a yoke 510 and the stator coil 425. The yoke insulating portion 430b may, for example, be configured to surround an upper surface, a lower surface and an inner surface of the yoke 510 of the stator core 420.

The electric motor 400 includes, for example, a housing 480 in which the stator 410 and the rotor 450 are accommodated.

The housing 480 defines, for example, an accommodation space in which the stator 140 is accommodated. A plurality of communication portions 482 are formed through a side surface of the housing 480 such that inside and outside communicate with each other. The housing 480 is provided with a bearing accommodating portion 485 to which the bearing 460 provided on the lower side of the rotor 450 is coupled. A flange 490 extends outwardly from an upper end of the housing 480 in the radial direction.

The inlet body 310 is fastened to the flange 490 of the housing 480.

The bearing support unit 350 that supports the bearing 460 disposed on the upper side of the rotor 450 is fastened to the flange 490 of the housing 480.

More specifically, the flange 315 of the inlet body 310 is coupled in contact with an outer side of the flange 490 of the housing 480 in the radial direction. The support plate 360 of the bearing support unit 350 is coupled to the inside of the inlet body 310 along the radial direction of the flange 490 of the housing 480.

The flange 490 of the housing 480 is provided with first fastening member coupling portions 494 to which the fastening members coupled to the inlet body 310 are fastened.

The flange 490 of the housing 480 is provided with second fastening member coupling portions 496 to which fastening members coupled to the bearing support unit 350 are fastened.

The second fastening member coupling portions 496 may be respectively disposed on a circumference having a diameter smaller than a diameter of a circumference on which the first coupling member coupling portions 494 are disposed.

A plurality of through portions 492 are formed through a planar surface of the flange 490 of the housing 480. The plurality of through portions 492 of the housing 480 are spaced apart along the circumferential direction. The plurality of through portions 492 of the housing 480 may be located between the adjacent second fastening member coupling portions 496. The plurality of through portions 492 of the housing 480 may be located between the adjacent second fastening member coupling portions 494.

Figure 6:
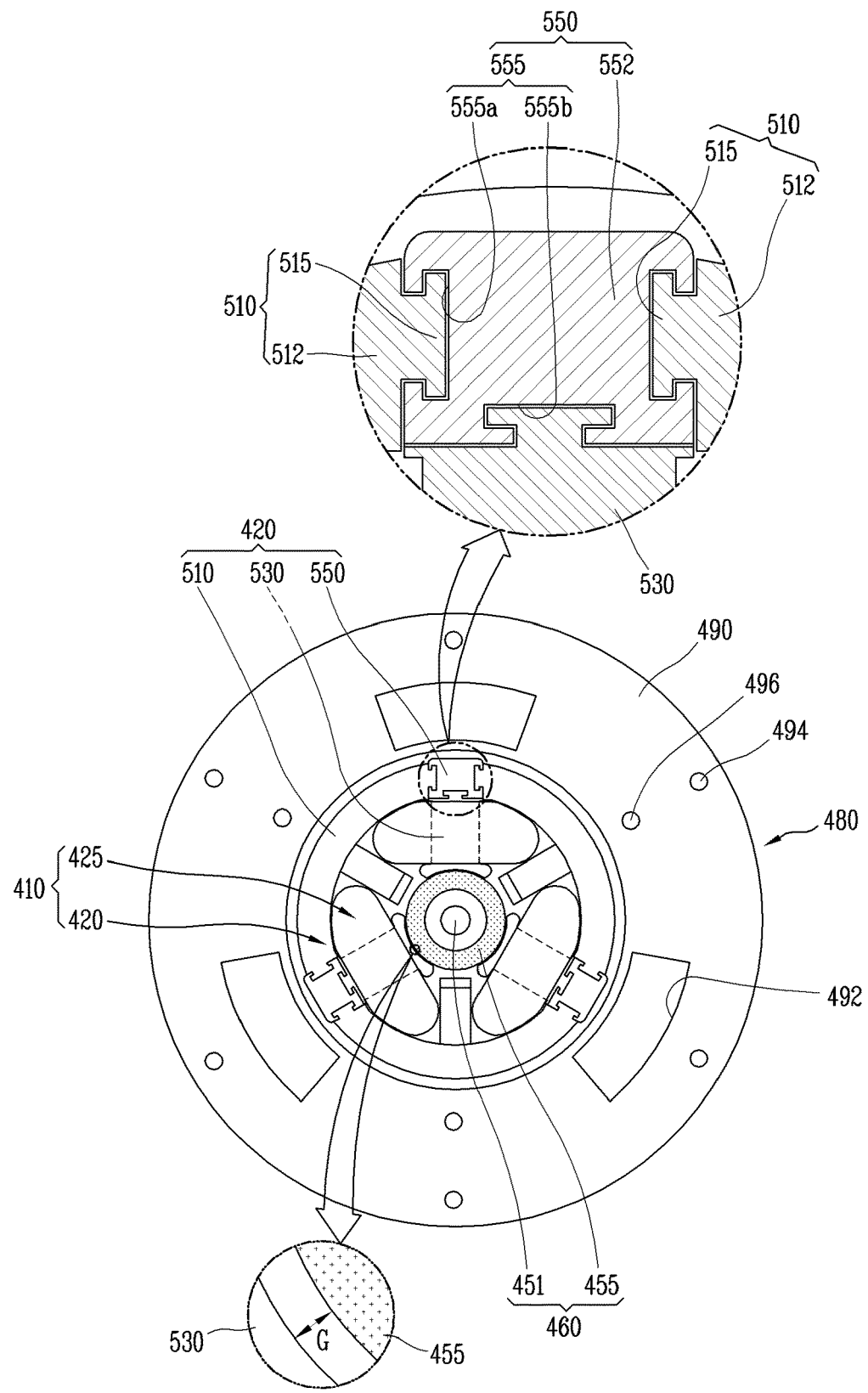
FIG. 6 is a planar view of the electric motor of FIG. 5.

FIG. 6 is a planar view of FIG. 5. As illustrated in FIG. 6, the electric motor 400 includes a stator 410 and a rotor 450. The stator 410 includes the stator core 420 and the stator coil 425 wound around the stator core 420.

The stator core 420 includes yokes 510 split along the circumferential direction, assembly connectors 550 each coupled between the two adjacent yokes 510, and teeth 530 each coupled to an inner side of the assembly connectors 550.

According to this configuration, a length of each yoke 510 can be shortened by a length of each assembly connector 550 along the circumferential direction of the stator core 420. This can suppress deformation of the yoke 510.

Also, a length of each tooth 530 can be shortened by a width of each assembly connector 550 along the radial direction of the stator core 420. This can suppress deformation of the tooth 530.

This embodiment illustrates an example in which the yoke 510, the assembly connector 550, and the tooth 530 are provided respectively by three in number. However, this is merely illustrative but the present disclosure is not limited to this.

The stator coil 425 may be configured as, for example, a so-called centralized winding that is intensively wound around the tooth 530.

The stator 410 further includes an insulator 430 interposed between the stator core 420 and the stator coil 425 for insulation between the stator core 420 and the stator coil 425.

In this embodiment, the stator coil 425 may be configured by including a plurality of coil portions each wound around a periphery of the tooth 530. In this embodiment, the plurality of coil portions are provided by three in number to correspond to the number of the teeth 530.

Figure 7:
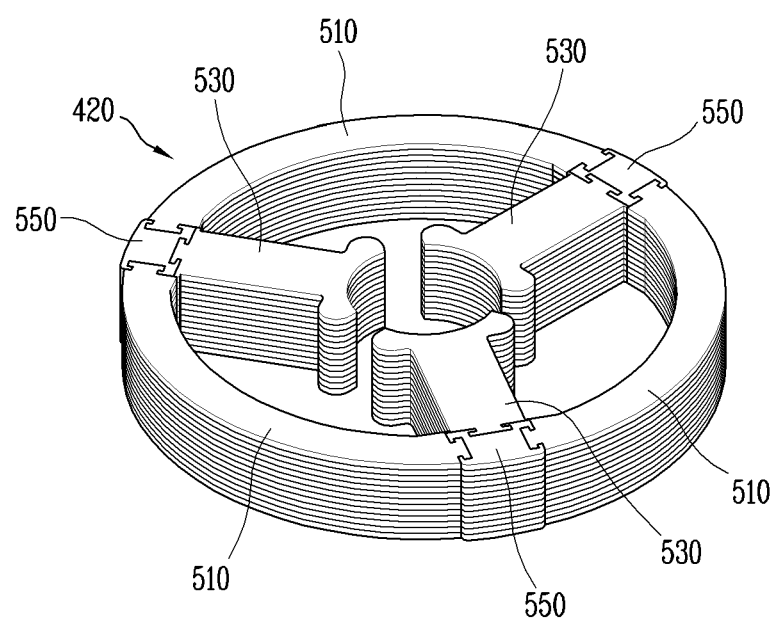
FIG. 7 is a perspective view illustrating a stator core of FIG. 6.
Figure 8:
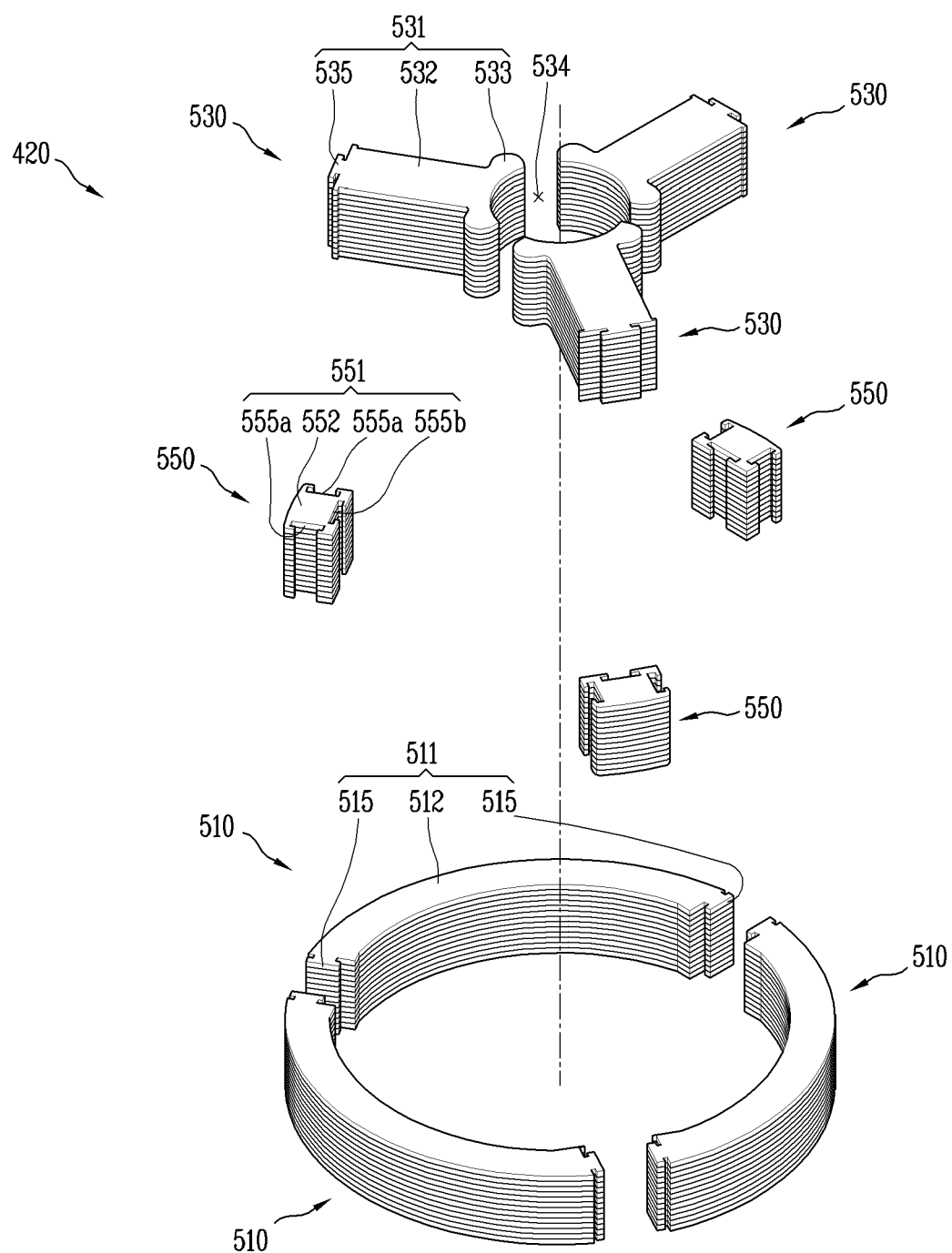
FIG. 8 is an exploded perspective view of the stator core of FIG. 7.

FIG. 7 is a perspective view illustrating a stator core of FIG. 6 and FIG. 8 is an exploded perspective view of the stator core of FIG. 7. As illustrated in FIGS. 7 and 8, the stator core 429 may be made of a magnetic substance. The stator core 420 may be configured by stacking in an insulating manner a plurality of electronic or electrical steel sheets (hereinafter, referred to as "electrical steel sheets".

The stator core 420 is provided with a rotor accommodating hole 534 in which the rotor 450 is rotatably disposed with a preset air gap G.

The yoke 510, the assembly connector 550, and the tooth 530 are, for example, configured to have the same thickness.

The yoke 510, the assembly connector 550, and the tooth 530 have bottom surfaces disposed on the same plane in the drawing, and upper surfaces disposed on the same plane in the drawing.

Each of the yokes 510 has, for example, an arcuate shape.

More specifically, the yoke 510 may be formed by, for example, stacking a plurality of electrical steel sheets 511 each having an arcuate shape.

Each of the plurality of electrical steel sheets 511 of the yoke 510 includes a yoke body 512 having the arcuate shape, and protruding portions 515 formed on both end portions of the yoke body 512, respectively.

Each of the teeth 530 has a shape like an alphabet "T".

Specifically, the tooth 530 may be formed by, for example, stacking a plurality of electrical steel sheets 531 having the "T" shape.

Each of the plurality of electrical steel sheets 531 of the tooth 530 includes a tooth body 532 having a substantially rectangular shape and a protruding portion 535 formed on an end portion of the tooth body 532.

Each of the assembly connectors 550 has a substantially rectangular parallelepiped shape.

Specifically, the assembly connector 550 may be formed by, for example, stacking a plurality of electrical steel sheets 551 each having a rectangular shape.

Each of the plurality of electrical steel sheets 551 of the assembly connector 550 includes an assembly connector body 552 having a substantially rectangular shape and a protrusion accommodating portion 555 formed in the assembly connector body 552.

Figure 9:
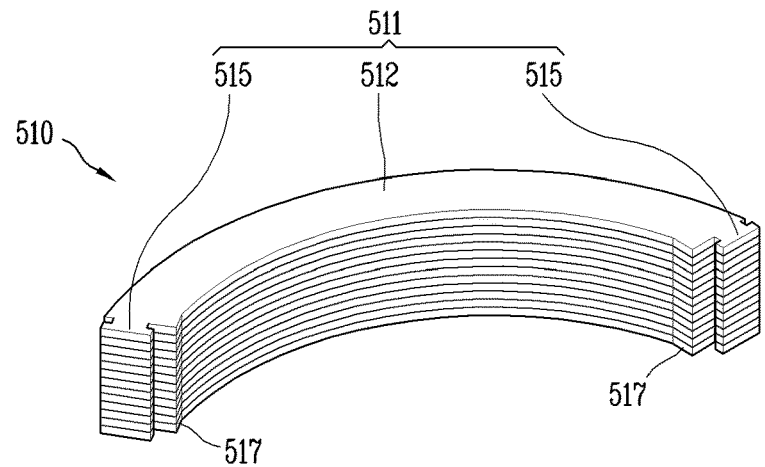
FIG. 9 is a perspective view illustrating a yoke of FIG. 8.
Figure 10:
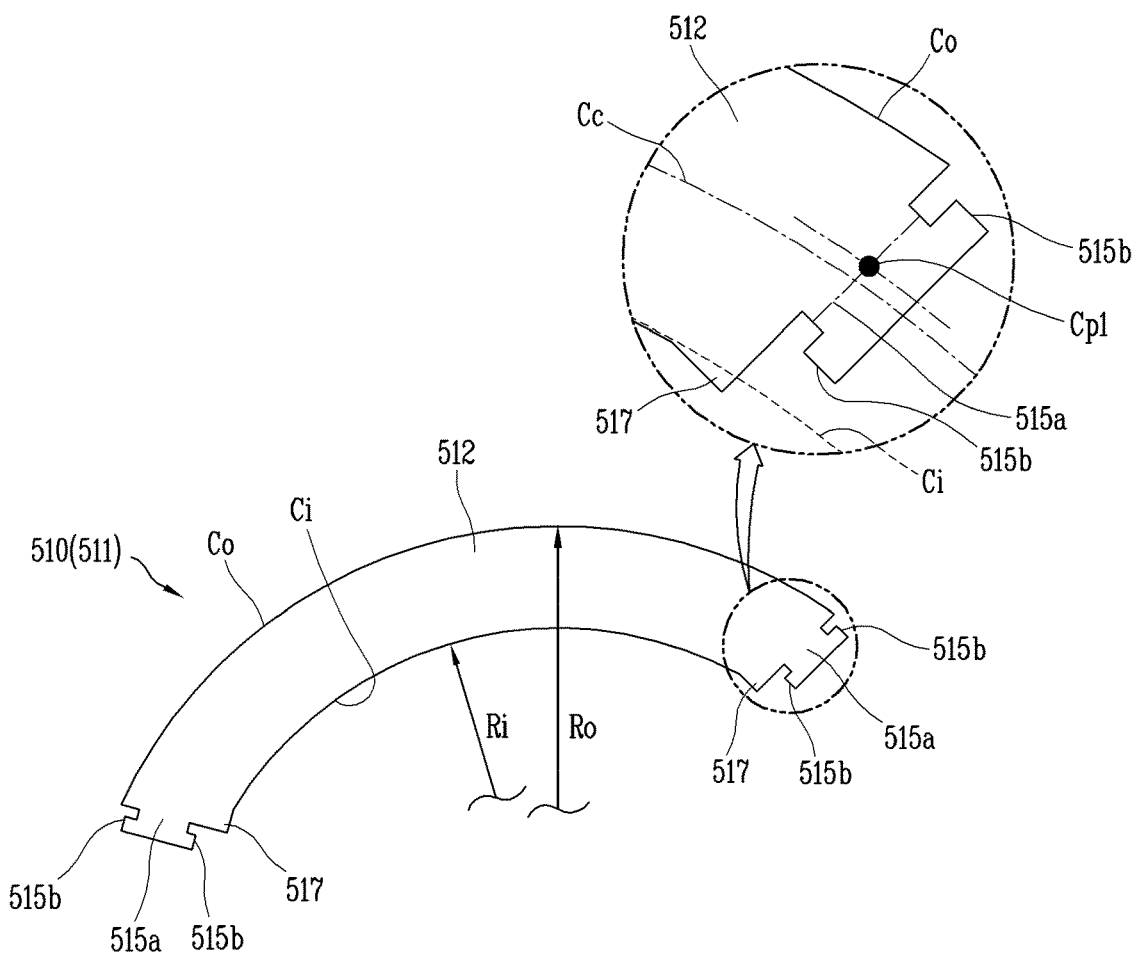
FIG. 10 is a planar view of the yoke of FIG. 9.

FIG. 9 is a perspective view illustrating a yoke of FIG. 8 and FIG. 10 is a planar view of the yoke of FIG. 9. As illustrated in FIGS. 9 and 10, the yoke 510 includes, for example, an outer diameter surface Co and an inner diameter surface Ci that are arranged concentrically with each other. The protruding portions 515 protrude from the both end portions of the yoke 510, respectively, in the circumferential direction of the stator core 420.

The protruding portions 515 include, for example, first protrusions 515a protruding from the both end portions of the yoke 510 (yoke body 512) in the circumferential direction, respectively, and second protrusions 515b protruding from the first protrusions 515a, respectively.

The second protrusions 515b may protrude to inner and outer sides of each of the first protrusions 515a.

The second protrusions 515b may be, for example, disposed in the radial direction of the stator core 420.

This embodiment illustrates an example in which the second protrusions 515b protrude to the outer and inner sides of the first protrusion 515a. However, this is merely illustrative and the second protrusion 515b may alternatively protrude to any one of the outer and inner sides of the first protrusion 515a.

The first protrusion 515a of the yoke 510 may be configured such that a center Cp1 (central line) thereof in the radial direction of the stator core 420 is located more outward than a center Cc (central line) of the yoke 510.

This can increase a length between an inner surface of the first protrusion 515a of the yoke 510 and an extension line of the inner diameter surface Ci of the yoke 510.

Accordingly, a thickness of a protrusion accommodating space of the assembly connector 550 for accommodating the first protrusion 515a of the yoke 510 can increase, thereby increasing coupling force between the yoke 510 and the assembly connector 550.

Conversely, a length between an outer surface of the first protrusion 515a and an extension line of the outer diameter surface Co of the yoke 510 can be shortened.

Accordingly, when a width of the assembly connector 550 (a radial width of the stator core 420) is large so that the outer surface of the assembly connector 550 protrudes more than the outer diameter of the yoke 510, the coupling force between the yoke 510 and the assembly connector 550 can increase.

On the other hand, extension portions 517 extend from both end regions of the yoke 510 to protrude more inwardly than the inner diameter surface of the yoke 519 along the radial direction of the stator core 420.

The extension portions 517 may be formed, for example, in a linear shape such that an inner diameter (inner width) thereof is gradually reduced.

Each of the extension portions 517 may be formed, for example, in a linear shape disposed at a right angle with respect to the extension direction (radial direction) of the tooth 530.

Each of the extension portions 517 of the yoke 510 may be disposed, for example, to be parallel with an inner surface of the assembly connector 550.

With this configuration, when the yoke 510 and the assembly connector 550 are coupled to each other, a contact surface of the yoke 510 that is brought into contact with a side portion of the assembly connector 550 can increase.

Accordingly, when the yoke 510 and the assembly connector 550 are coupled to each other, deformation of an end region of the yoke 510 can be suppressed.

Figure 11:
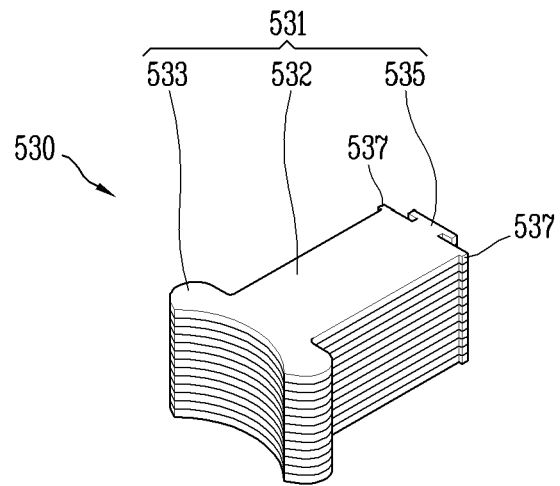
FIG. 11 is a perspective view illustrating a tooth of FIG. 8.
Figure 12:
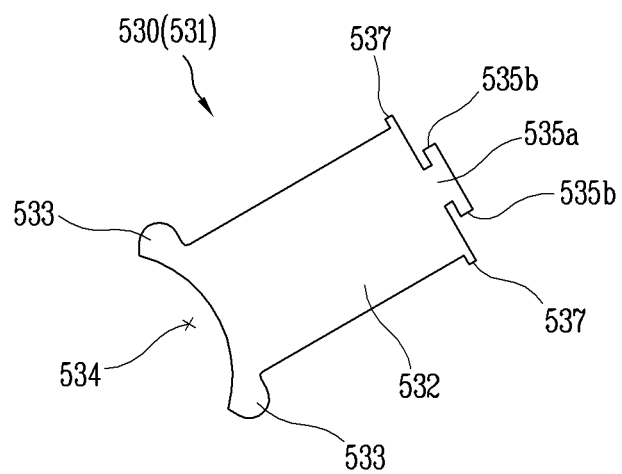
FIG. 12 is a planar view of the tooth of FIG. 11.

FIG. 11 is a perspective view illustrating a tooth of FIG. 8 and FIG. 12 is a planar view of the tooth of FIG. 11. As illustrated in FIGS. 11 and 12, the tooth 530 includes a tooth body 532 and a protruding portion 535 protruding from the tooth body 532 in a longitudinal direction.

The tooth body 532 is implemented, for example, in a rectangular shape having the same width. Shoes 533 extend respectively from both sides of one end portion (an inner end portion) of the tooth body 532 in the circumferential direction. An inner surface of each shoe 533 is formed in an arcuate shape. As the inner surface of each shoe 533 of the tooth 530 is disposed on the same circumference, a rotor accommodating hole 534 is defined at an inner side of the shoe 533 with a preset air gap from the rotor 450.

The protruding portion 535 coupled to the assembly connector 550 is located at another end portion (an outer end portion) of the rotor 450. The protruding portion 535 of the tooth 530 includes a first protrusion 535a protruding along the radial direction of the stator core 420, and second protrusions 535b protruding from the first protrusion 535a. The second protrusions 535b of the tooth 530, for example, protrude from the first protrusion 535a along the circumferential direction of the stator core 420. The second protrusions 535b of the tooth 530 protrude to both sides from an end portion of the first protrusion 535a, respectively.

The first protrusion 535a is formed so that a center line along the radial direction of the stator core 420 coincides with a center line (a center line along the radial direction) of the tooth body 532.

A width (a circumferential width) of the tooth 530 may be smaller than a width (a circumferential length) of the assembly connector 550.

The tooth 530 includes the extension portions 537 that can be in contact with the inner surface of the assembling connector 550 when assembling with the assembly connector 550.

The extension portions 537 of the tooth 530 are formed on both sides of the outer end portion of the tooth body 532.

The extension portions 537 of the tooth 530 may be formed, for example, symmetrically with respect to the center line of the tooth body 532 and the first protrusion 535a.

Accordingly, when the tooth 530 and the assembly connector 550 are coupled to each other, a contact area between the tooth 530 and the assembly connector 550 can increase.

With the configuration, when the tooth 530 and the assembly connector 550 are coupled to each other, coupling force between the tooth 530 and the assembly connector 550 can increase.

Figure 13:
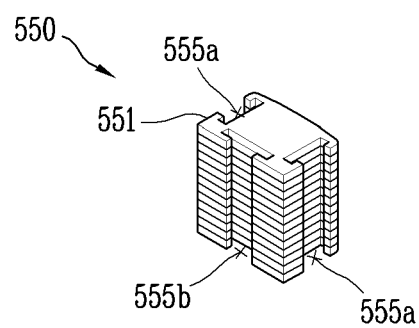
FIG. 13 is a perspective view illustrating an assembly connector of FIG. 8.
Figure 14:
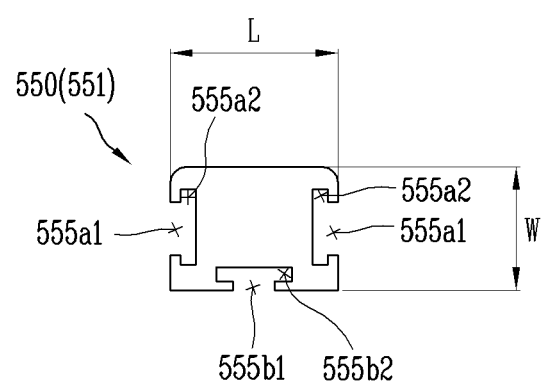
FIG. 14 is a planar view of the assembly connector FIG. 13.

FIG. 13 is a perspective view illustrating an assembly connector of FIG. 8 and FIG. 14 is a planar view of the assembly connector FIG. 13. As illustrated in FIGS. 13 and 14, the assembly connector 550 includes an assembly connector body 552 and a protrusion accommodating portion 555 formed in the assembly connector body 552. The assembly connector body 552 has a substantially rectangular parallelepiped shape. The assembly connector 550 has preset length L and width W. The assembly connector 550 is disposed to have a long length L along the circumferential direction of the stator core 420. Specifically, the yokes 510 are coupled to both end portions along the longitudinal direction of the assembly connector 550, respectively. The tooth 530 is coupled to the inner surface of the assembly connector 550.

The assembly connector 550 is configured such that the length L is larger than the width (the circumferential width) of the tooth 530.

Accordingly, when the tooth 530 and the assembly connector 550 are coupled, the coupling force can increase to firmly support the tooth 530.

In addition, when the tooth 530 and the assembly connector 550 are coupled to each other, the deformation of the assembly connector 550 can be suppressed.

The assembly connector 550 is configured so that the width W is larger than a thickness (a circumferential width) of the yoke 510.

Accordingly, when the yoke 510 and the assembly connector 550 are coupled to each other, the coupling force can increase to firmly support the yoke 510.

In addition, when the yoke 510 and the assembly connector 550 are coupled to each other, the deformation of the assembly connector 550 can be suppressed.

The assembly connector 550 may be coupled to the yoke 510 so that an inner surface thereof corresponds to the inner diameter surface of the yoke 510.

The outer surface of the assembly connector 550 protrudes outward compared to the outer diameter surface of the yoke 510.

A protrusion accommodating portion 555, in which the protruding portions of the yoke 510 can be accommodated from both side surfaces of the assembly connector 550, is formed in the assembly connector 550.

The protrusion accommodating portion 555 includes side protrusion accommodating spaces 555a respectively formed in both side surfaces of the assembly connector 550 along the circumferential direction of the stator core 420.

Each of the side protrusion accommodating spaces 555a includes a first protrusion accommodating spaces 555a1 in which the first protrusion 535a of the yoke 510 is accommodated.

The side protrusion accommodating spaces 555a are open to both sides (left and right sides in the drawing) of the assembly connector 550, respectively.

Each of the side protrusion accommodating spaces 555a includes, for example, second protrusion accommodating spaces 555a2 that communicate with the first protrusion accommodating space 555a1 and extend in the radial direction of the stator core 420, respectively.

Here, a distance from the second protrusion accommodating space 555a2 of the side protrusion accommodating space 555a to the inner surface of the assembly connector 550 is larger than a protrusion length of the second protrusion 515b of the yoke 510.

This can suppress an occurrence of an inner displacement of the yoke 510 due to an external force applied in an inward direction of the stator core 420.

Also, a distance from the second protrusion accommodating space 555a2 of the side protrusion accommodating space 555a to the outer surface of the assembly connector 550 is larger than the protrusion length of the second protrusion 515b of the yoke 510.

This can suppress an occurrence of an outer displacement of the yoke 510 due to an external force applied in an outward direction of the stator core 420.

With this configuration, the occurrence of the inner and outer displacements of the yoke 510 when external force is applied in the radial direction of the stator core 420 can be suppressed, thereby firmly supporting the yoke 510.

Figure 15:
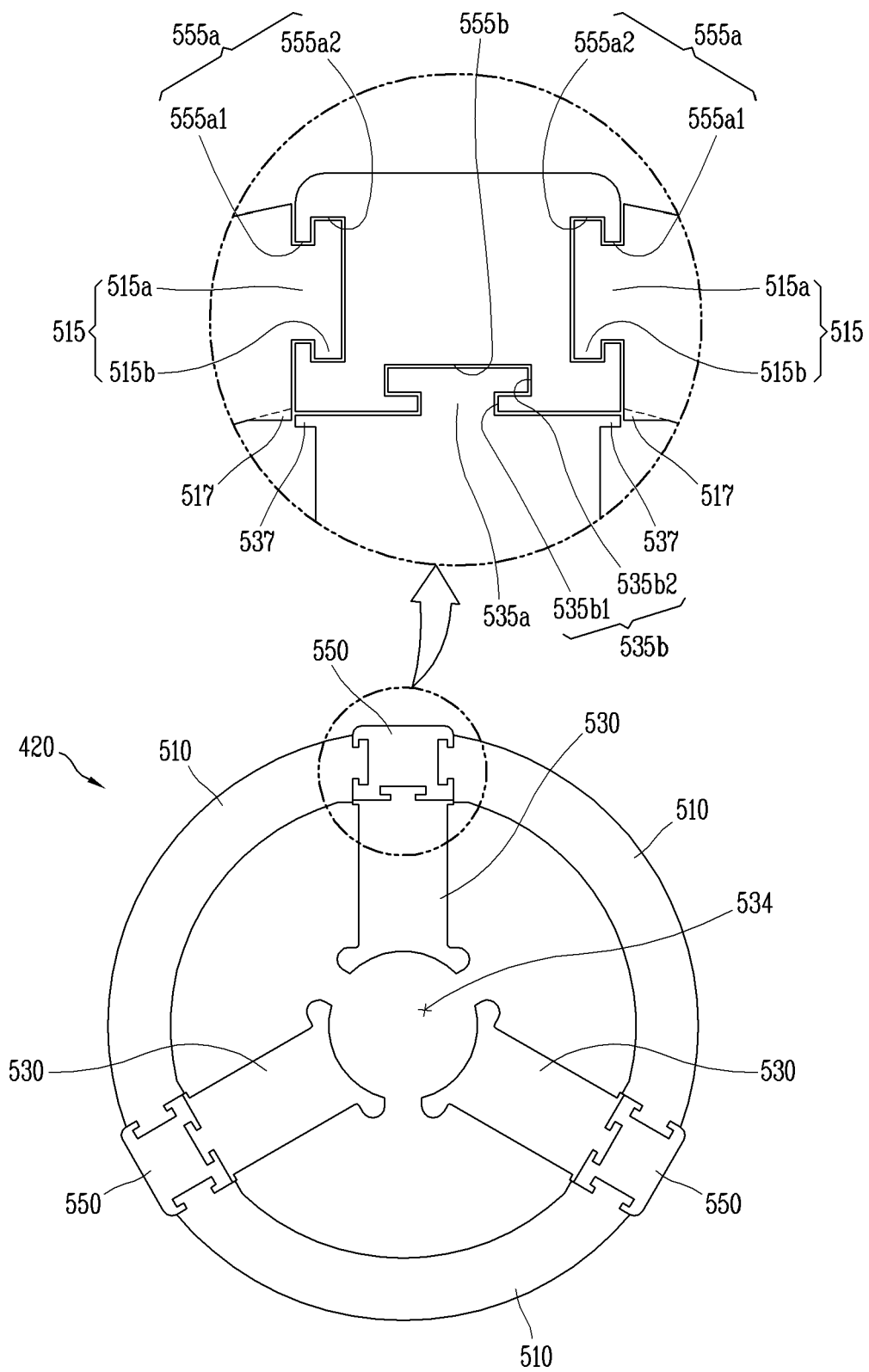
FIG. 15 is a planar view illustrating a coupled state of the stator core of FIG. 8.

FIG. 15 is a planar view illustrating a coupled state of the stator core of FIG. 8. As illustrated in FIG. 15, the assembly connectors 550 are spaced apart from one another at preset distances along the circumferential direction of the stator core 420. The yokes 510 are respectively coupled to both sides of each of the assembly connectors 550. Each of the yokes 510 has an outer diameter and an inner diameter that are concentric with each other. The yokes 510 has the same thickness in the radial direction of the stator core 420.

The yokes 510 may have a thickness of 3.10 mm, for example. More specifically, for example, the outer diameter of each yoke 510 may be implemented as 39.00 mm. The inner diameter of each yoke 510 may be implemented as 32.80 mm, for example. The protruding portions 515 are respectively provided on the both end portions of each of the yokes 510. Each of the protruding portions 515 of the yoke 510 includes a first protrusion 515a protruding along the circumferential direction of the stator core 420, and second protrusions 515b protruding from the first protrusion 515a along the radial direction of the stator core 420.

Extension portions 517 are respectively disposed on both end portions of the yoke 510 so that the width of the yoke 510 gradually increases along the radial direction of the stator core 420. The extension portions 517 of the yoke 510 may have a maximum width of 3.42 mm, for example. A length of each of the extension portions 517 may be implemented as 1.27 mm, for example. Each of the extension portions 517 may extend by the length of 1.27 mm from the end portion of the yoke 510.

Since the yoke 510 has the outer diameter of 39.00 mm, the inner diameter of 32.80 mm, and the thickness of 3.10 mm, and each of the extension portions 517 has the maximum width of 3.42 mm, the extension portion 517 may protrude by up to 0.32 mm inward with respect to the inner diameter of the yoke 510.

The tooth 530 may have, for example, a width of 5.00 mm along the radial direction of the stator core 420. The protruding portion 535 is disposed on an end portion (an outer end portion) of the tooth 530. The protruding portion 535 of the tooth 530 includes, for example, a first protrusion 535a protruding outward along the radial direction of the stator core 420, and second protrusions 535b protruding from the first protrusion 535a along the circumferential direction of the stator core 420.

Extension portions 537 extend from the outer end portion of the tooth 530 to correspond to the adjacent assembly connectors 550. Each of the extension portions 537 may have, for example, a maximum width that corresponds to the length (the circumferential width) of the assembly connector 550.

On the other hand, the assembly connector 550 is implemented, for example, in a rectangular parallelepiped shape. The assembly connector 550 may be implemented to have a rectangular cross-section, for example. The assembly connector 550 may be implemented to have a long length L along the circumferential direction of the stator core 420.

Here, the length (the circumferential width) of the assembly connector 550 may be larger than the width of the tooth 530. The width (the radial width) of the assembly connector 550 may be larger than the maximum width of the yoke 510. When the inner surface of the assembly connector 550 is disposed to correspond to the inner surface (the extension portion) of the yoke 510, the outer surface of the assembly connector 550 protrudes outward from the outer surface of the yoke 510.

The length of the assembly connector 550 may be implemented as 5.60 mm, for example. The width of the assembly connector 550 may be implemented as 3.82 mm, for example. Here, since the width of the assembly connector 550 is larger than the width of the yoke 510, when the inner surface of assembly connector 550 is disposed to correspond to the inner surface of the yoke 510 in the radial direction of the stator core 420, the assembly connector 550 may protrude outward with respect to the outer surface of the yoke 510. In this embodiment, the width of the assembly connector 550 is 3.82 mm. Therefore, when the assembly connector 550 is disposed to correspond to the extension portion of the yoke 510, the outer surface of the assembly connector 550 may protrude by about 0.40 mm from the outer surface of the yoke 510.

The first protrusion of the yoke 510 may have a width of, for example, 1.69 mm. The first protrusion accommodating space 555a1 of the side protrusion accommodating space 555a of the assembly connector 550 may be, for example, smaller than 1.69 mm so as to be fitted with a predetermined interference when the first protrusion 515a of the yoke 510 is coupled.

The second protrusions 515b of the yoke 510 may protrude from the first protrusion 515a by a protrusion length of 0.34 mm. A distance between end portions of the second protrusions 515b may be 2.37 mm. The second protrusion accommodating spaces 555a2 of the side protrusion accommodating space 555a of the assembly connector 550 may be smaller than 2.37 mm.

The first protrusion 535a of the tooth 530 may have a width of, for example, 1.75 mm. A first protrusion accommodating space 555b1 of an inner protrusion accommodating space 555b that configures the protrusion accommodating portion 555 of the assembly connector 550 may be smaller than 1.75 mm so as to be fitted with a predetermined interference when the first protrusion 535a of the tooth 530 is coupled. The second protrusions 535b of the tooth 530 may protrude from the first protrusion 535a of the tooth 530 by a protrusion length of 0.525 mm, respectively. Second protrusion accommodating spaces 555b2 of the inner protrusion accommodating space 555b of the assembly connector 550 may be smaller than 2.80 mm.

In this embodiment, in the configuration that the side protrusion accommodating spaces 555a of the assembly connector 550 are formed smaller than the protruding portions 515 of the yoke 510 and the inner protrusion accommodating space 555b of the assembly connector 550 is formed smaller than the protruding portion 535 of the tooth 530, a degree that they are formed to be small means a degree that interference-fit is allowed.

With this configuration, the protruding portions 515 of the yokes 510 can be fitted to the side protrusion accommodating spaces 555a of the assembly connector 550. The protruding portion 535 of the tooth 530 may be fitted to the inner protrusion accommodating space 555b of the assembly connector 550.

Here, the assembly connector 550, the yokes 510, and the tooth 530 may be adjusted in temperature to have a preset temperature difference before coupling.

For example, the assembly connector 550 may be heated to have a relatively high temperature with a preset temperature difference from the yoke 510 and the tooth 530.

Accordingly, the side protrusion accommodating spaces 555a and the inner protrusion accommodating space 555b of the assembly connector 550 may be expanded.

With this configuration, after the side protrusion accommodating spaces 555a and the inner protrusion accommodating space 555b of the assembly connector 550 are heated and expanded, the protruding portions 515 of the yoke 510 and the protruding portion 535 of the tooth 530 can be accommodated and coupled. This can facilitate smooth coupling between the assembly connector 550 and the yokes 510 and between the assembly connector 550 and the tooth 530.

Since the protrusion accommodating portion 555 of the assembly connector 550 is in the expanded state due to the rise in temperature, compared to the protruding portions 515 of the yokes 510 and the protruding portion 535 of the tooth 530, its rigidity (strength) is lowered and an elongation is increased compared to the protruding portions 515 of the yokes 510 and the protruding portion 535 of the tooth 530. Accordingly, when they are coupled, the protruding portions 515 of the yokes 510 and the protruding portion 535 of the tooth 530 can be prevented from being deformed due to the contact with the protrusion accommodating portion 555 of the assembly connector 550.

Figure 16:
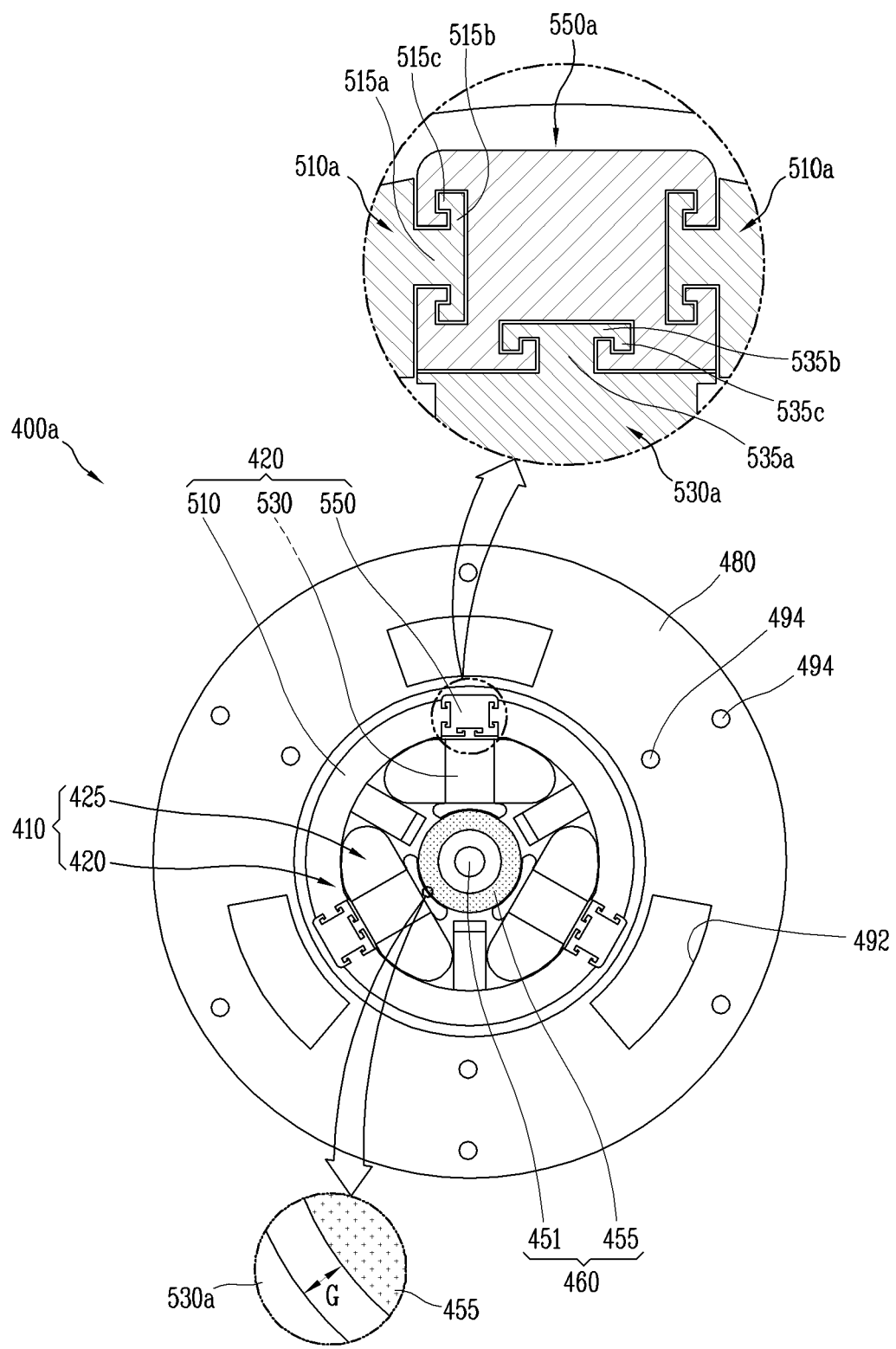
FIG. 16 is a planar view corresponding to FIG. 6 of an electric motor in accordance with another embodiment.
Figure 17:
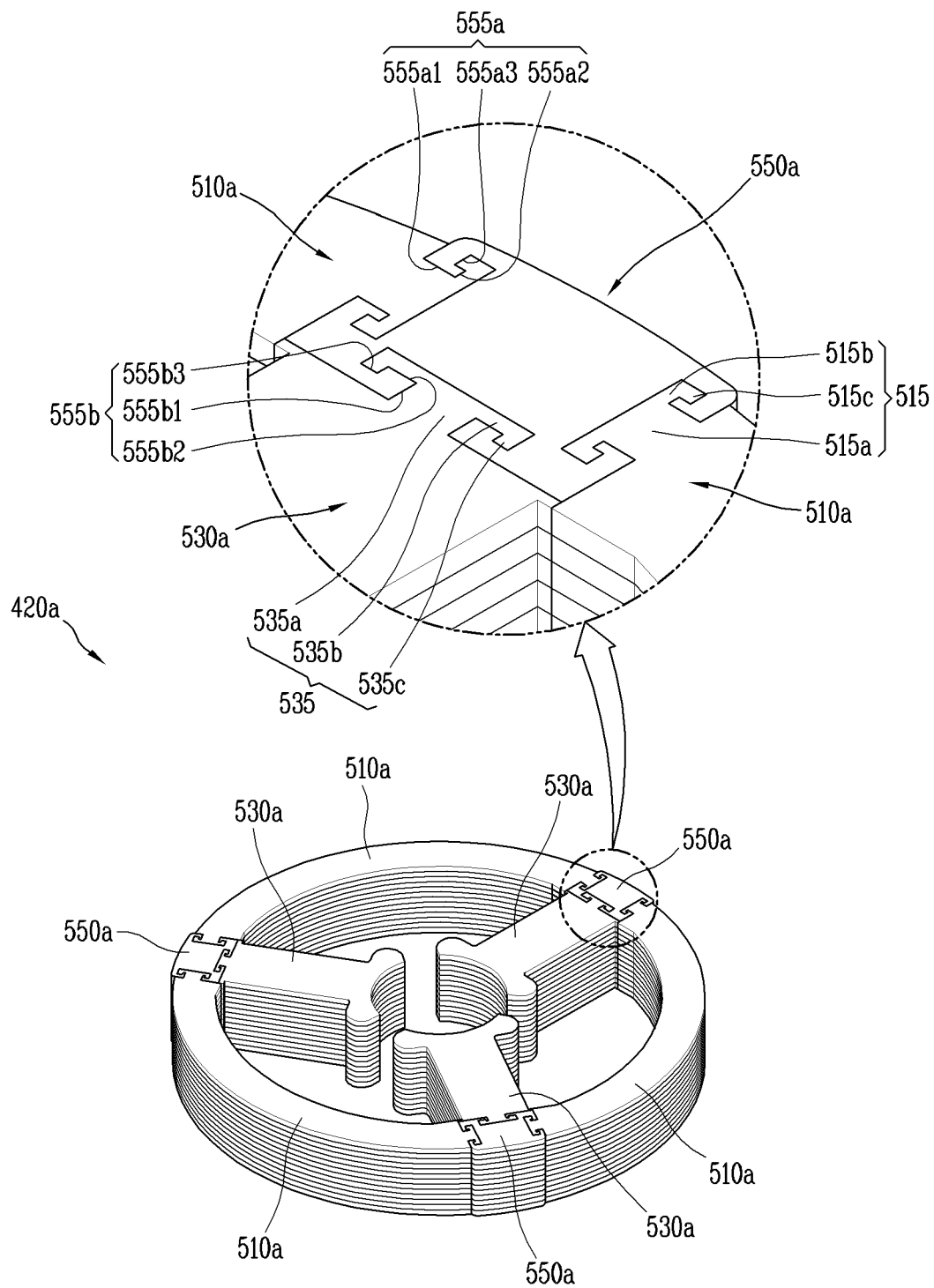
FIG. 17 is a perspective view illustrating a stator core of FIG. 16.
Figure 18:
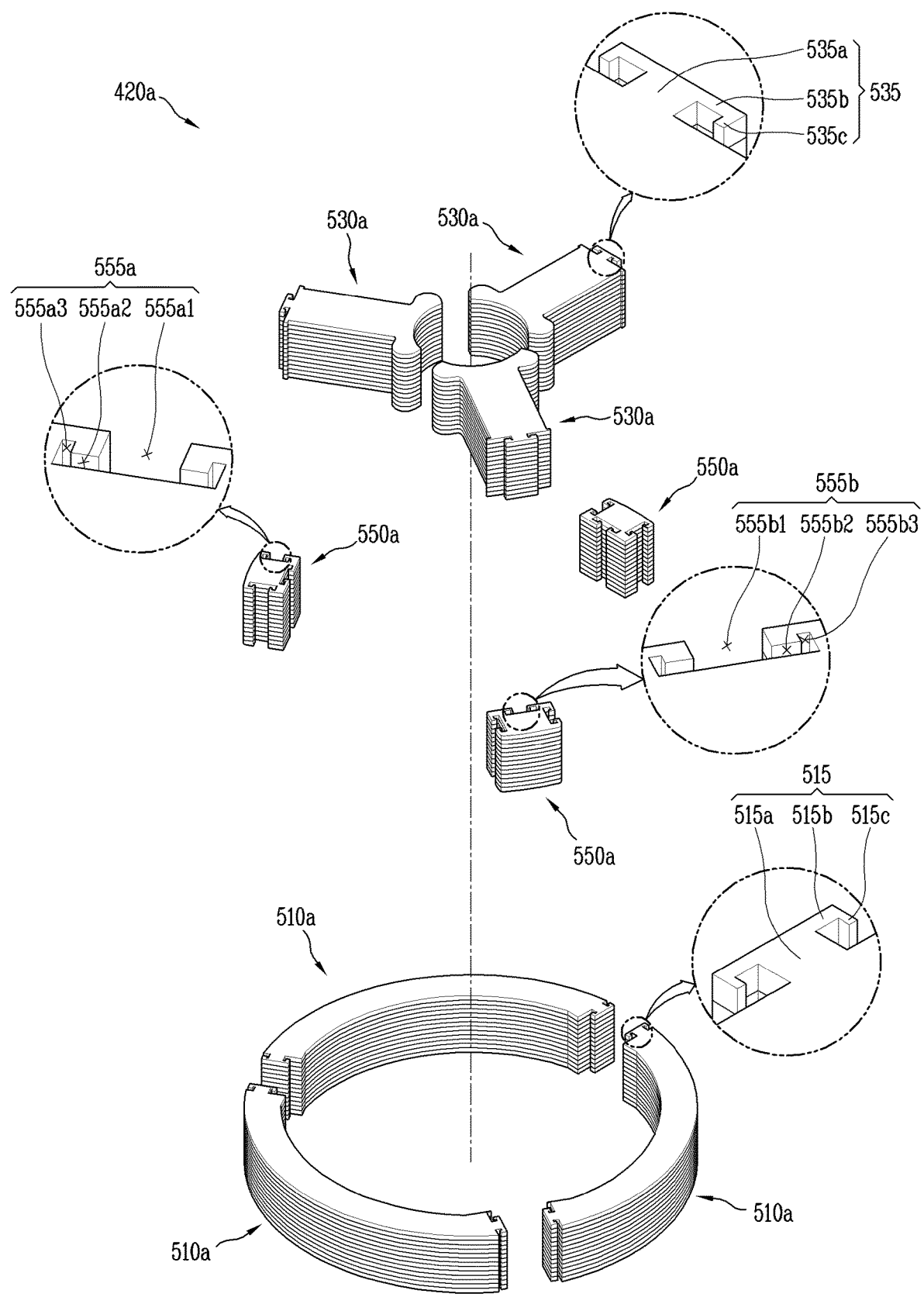
FIG. 18 is an exploded perspective view of the stator core of FIG. 17.
Figure 19:
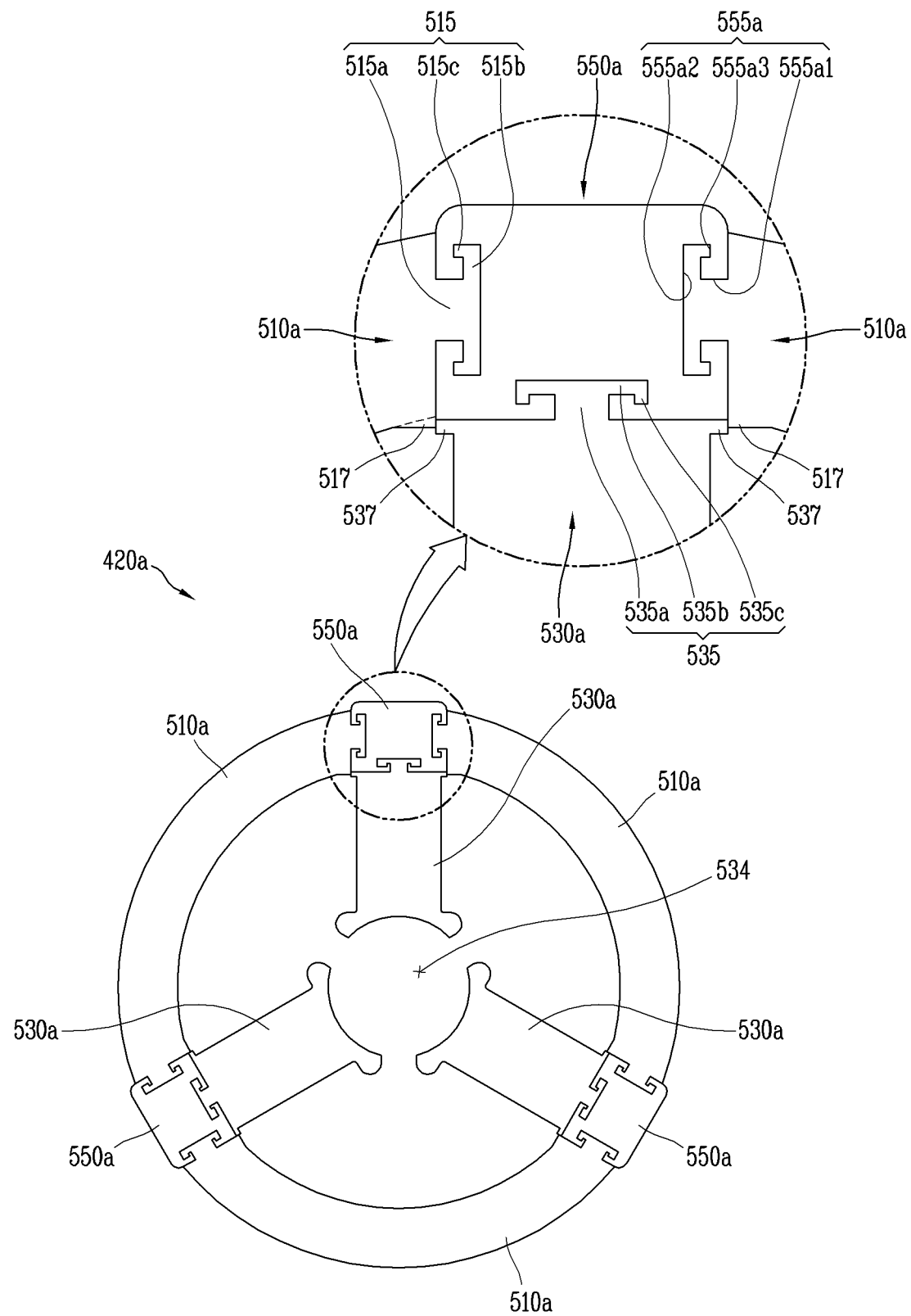
FIG. 19 is a planar view illustrating a coupled state of the stator core of FIG. 17.

FIG. 16 is a planar view corresponding to FIG. 6 of an electric motor in accordance with another embodiment, FIG. 17 is a perspective view illustrating a stator core of FIG. 16, FIG. 18 is an exploded perspective view of the stator core of FIG. 17, and FIG. 19 is a planar view illustrating a coupled state of the stator core of FIG. 17. As described above, the electric motor 400a of the embodiment includes the impeller 210, a stator 410a, and the rotor 450. The impeller 210 includes the hub 212 and the plurality of blades 217 disposed along the circumference of the hub 212. The inlet body 310 is disposed outside the impeller 210, and the housing 480 is disposed at one side of the inlet body 310. The stator 410a is accommodated inside the housing 480. The rotor 450 is rotatably disposed inside the stator 410a with a preset air gap G therebetween.

As illustrated in FIG. 16, the rotor 450 includes the rotating shaft 451 and the permanent magnet 455 coupled to the rotating shaft 451 to rotate centering on the rotating shaft 451.

The stator 410a includes a stator core 420a and the stator coil 425 wound around the stator core 420a. The stator coil 425 is implemented, for example, as a concentrated winding that the stator coil 425 is intensively wound around the tooth 530a of the stator core 420a. As described above, the electric motor 400a of this embodiment has a relatively small size (e.g., an outer diameter of a yoke 510a of the stator 410a is about 39.0 mm), and is allowed to rotate at a high speed (e.g., about 160 to 200 krpm). The stator 410a includes the insulator 430 interposed between the stator core 420a and the stator coil 425 (refer to FIG. 4). Accordingly, an occurrence of a short-circuit between the stator core 420a and the stator coil 425 can be suppressed.

On the other hand, as illustrated in FIGS. 17 and 18, the stator core 420a of the electric motor 400a of this embodiment includes yokes 510a split along the circumferential direction, assembly connectors 550a each coupled between the two adjacent yokes 510, and teeth 530a each coupled to an inner side of the assembly connector 550.

The yoke 510a, the assembly connector 550a and the tooth 530a may be provided by three in number, respectively.

This embodiment illustrates an example in which the yoke 510a, the assembly connector 550a, and the tooth 530a are provided respectively by three in number. However, this is merely illustrative but the present disclosure is not limited to this.

The stator core 420a may be formed of a magnetic substance.

Each of the yokes 510a has an arcuate shape.

Specifically, the yoke 510a may be formed by, for example, stacking a plurality of electrical steel sheets 511 each having an arcuate shape.

Each of the assembly connectors 550a has a rectangular parallelepiped shape.

Specifically, the assembly connector 550a may be formed by, for example, stacking a plurality of electrical steel sheets 551 each having a rectangular shape.

Each of the teeth 530a has a shape like an alphabet "T".

Specifically, the tooth 530a may be formed by, for example, stacking a plurality of electrical steel sheets 531 having the "T" shape.

Each of the yokes 510a includes a yoke body 512 having the arcuate shape, and protruding portions formed on both end portions of the yoke body 512. The yoke body 512 includes extension portions 517 protruding inward from an inner diameter surface of the yoke body 512.

In this embodiment, the assembly connector 550a has, for example, a length L larger than a width of the tooth 530a. The assembly connector 550a has a width W more expanded than a radial thickness of the yoke 510a.

Meanwhile, in this embodiment, the protruding portions 515 of the yoke 510a include first protrusions 515a protruding from both end portions of the yoke body 512, respectively, second protrusions 515b protruding from each of the first protrusions 515a, and third protrusions 515c protruding from the second protrusions 515b, respectively.

Specifically, the first protrusions 515a of the yoke 510a may protrude respectively from the end portions of the yoke 420a along the circumferential direction, for example.

The second protrusions 515b of the yoke 510a may protrude, for example, from each of the first protrusions 515a in the radial direction of the stator core 420a.

The second protrusions 515b of the yoke 510a may protrude to inner and outer sides of the first protrusion 515a of the yoke 510a, for example.

The third protrusions 515c of the yoke 510a may protrude from the second protrusions 515b, respectively, along the circumferential direction of the stator core 420a.

The third protrusions 515c of the yoke 510a may protrude from the second protrusions 515b of the yoke 510a, respectively, toward the end portion of the yoke body 512.

The tooth 530a includes a tooth body 532 and a protruding portion 535 protruding from an end portion of the tooth body 532. Extension portions 537 may extend from the tooth body 532 to come in contact with an inner surface of the assembly connector 550a. The extension portions 537 of the tooth 530a are formed on both sides of the tooth body 532.

In this embodiment, the protruding portion 535 of the tooth 530a includes a first protrusion 535a protruding from an end portion of the tooth body 532, second protrusions 535b protruding from the first protrusion 535a, and third protrusions 535c protruding from the second protrusions 535b, respectively.

Specifically, the first protrusion 535a of the tooth 530a may protrude from an outer end portion of the tooth body 532 in the radial direction of the stator core 420a.

The second protrusions 535b of the tooth 530a may protrude from the first protrusion 535a of the tooth 530a in the circumferential direction of the stator core 420a.

The second protrusions 535b of the tooth 530a may protrude to both sides of the first protrusion 535a of the tooth 530a, for example.

The third protrusions 535c of the tooth 530a may protrude from the second protrusions 535b of the tooth 530a, respectively, in the radial direction of the stator core 420a.

The third protrusions 535c of the tooth 530a may protrude, for example, to inner sides of the second protrusions 535b of the tooth 530a (the end portion of the tooth body 532), respectively.

On the other hand, the assembly connector 550a includes an assembly connector body 552 having a rectangular parallelepiped shape, and a protrusion accommodating portion 555 formed in the assembly connector body 552.

The protrusion accommodating portion 555 of the assembly connector 550a includes side protrusion accommodating spaces 555a respectively formed in both side surfaces of the assembly connector body 552, and an inner protrusion accommodating space 555b formed in an inner surface of the assembly connector body 552.

In this embodiment, each of the side protrusion accommodating spaces 555a is configured by including a first protrusion accommodating space 555a1, second protrusion accommodating spaces 555a2, and third protrusion accommodating portions 555a3 in which the first protrusion 515a, the second protrusions 515b, and the third protrusions 515c of the yoke 510a are accommodated.

With this configuration, when the yoke 510a and the assembly connector 550a are coupled to each other, a relative movement of the first protrusion accommodating space 555a1 of the side protrusion accommodating space 555a of the assembly connector 550a and the first protrusion 515a of the yoke 510a in the radial direction of the stator core 420a can be suppressed.

This can remarkably improve coupling force between the first protrusion 515a of the yoke 510a and the first protrusion accommodating space 555a1 of the side protrusion accommodating space 555a of the assembly connector 550a.

In this embodiment, the inner protrusion accommodating space 555b is configured by including a first protrusion accommodating space 555*b*1, second protrusion accommodating spaces 555*b*2, and third protrusion accommodating spaces 555*b*3 in which the first protrusion 535*a*, the second protrusions 535*b*, and the third protrusions 535*c* of the yoke 530*a* are accommodated.

With this configuration, when the tooth 530*a* and the assembly connector 550*a* are coupled to each other, a relative movement of the first protrusion accommodating space 555*b*1 of the inner protrusion accommodating space 555*b* of the assembly connector 550*a* and the first protrusion 535*a* of the tooth 530*a* in the circumferential direction of the stator core 420*a* can be suppressed.

This can remarkably improve coupling force between the first protrusion 535*a* of the tooth 530*a* and the first protrusion accommodating space 555*b*1 of the inner protrusion accommodating space 555*b* of the assembly connector 550*a*.

Meanwhile, as illustrated in FIG. 19, the assembly connectors 550*a* may be spaced apart from one another at preset intervals along the circumferential direction. The yokes 510*a* may be respectively coupled to both sides of the assembly connector 550*a*. The tooth 530*a* may be coupled to the inner surface of each assembly connector 550*a*.

Here, when the yokes 510*a*, the assembly connector 550*a* and the tooth 530*a* are coupled, the assembly connector 550*a* may be heated to a higher temperature so as to have a preset temperature difference from the yokes 510*a* and the tooth 530*a*.

According to this configuration, in the state in which the side protrusion accommodating spaces 555*a* and the inner protrusion accommodating space 555*b* of the assembly connector 550*a* have been expanded, respectively, the protruding portions 515 of the yokes 510*a* and the protruding portion 535 of the tooth 530 can be inserted therein.

Due to the rise in temperature of the side protrusion accommodating spaces 555*a* and the inner protrusion accommodating space 555*b* of the assembly connector 550*a*, those accommodating spaces have relatively lower rigidity (strength) and higher elongation than the protruding portions 515 of the yokes 510*a* and the protruding portion 535 of the tooth 530*a*. This can suppress an occurrence of deformation of the protruding portions 515 of the yokes 510*a* and the protruding portion 535 of the tooth 530*a* due to the contact with the side protrusion accommodating spaces 555*a* and the inner protrusion accommodating space 555*b* of the assembly connector 550*a* during coupling.

In the electric motor 400*a* of this embodiment, when the stator core 420*a* is coupled, the occurrence of the deformation of the yokes 510*a* and the teeth 530*a* can be suppressed, so that the concentricity of the yokes 510*a* and the teeth 530*a* after coupling can be maintained in a preset state.

Therefore, a uniform air gap can be maintained between the stator 410*a* and the rotor 450.

Also, since the coupling force among the yokes 510*a*, the assembly connectors 550*a* and the teeth 530*a* can be stably maintained, the uniform air gap G between the stator 410*a* and the rotor 450 can be continuously maintained during operation.

This can suppress an occurrence of a decrease in output of the electric motor 400*a* due to a non-uniform air gap between the stator 410*a* and the rotor 450.

Figure 20:
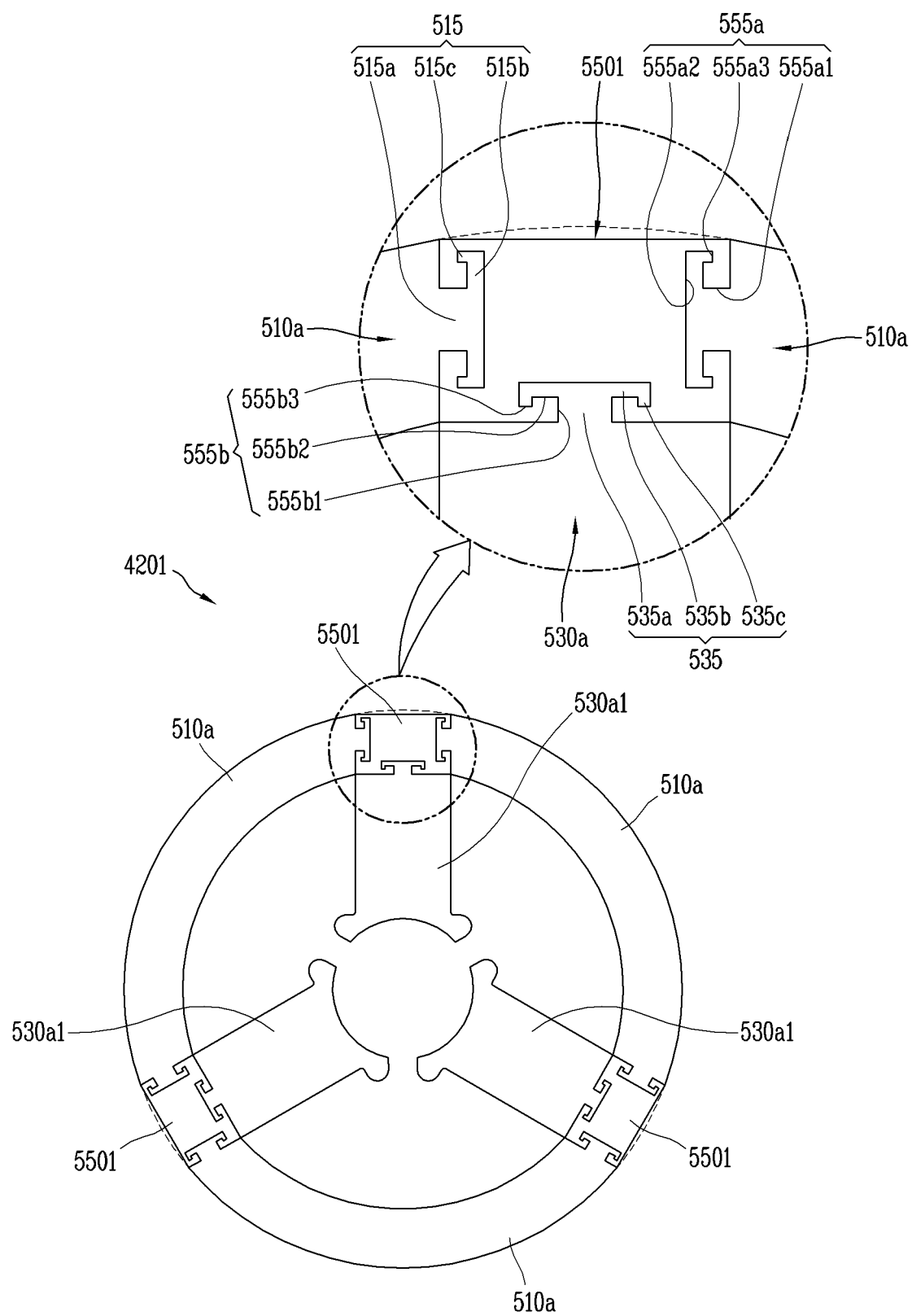
FIG. 20 is a view corresponding to FIG. 19 of a stator core of an electric motor in accordance with still another embodiment.

FIG. 20 is a view corresponding to FIG. 19 of a stator core of an electric motor in accordance with still another embodiment. As illustrated in FIG. 20, a stator core 4201 of an electric motor 400*a* according to this embodiment includes yokes 510*a* split along the circumferential direction, assembly connectors 5501 each coupled between the two adjacent yokes 510 continuously disposed in the circumferential direction, and teeth 530*a* each coupled to an inner surface of the assembly connector 550.

Each of the yokes 510*a* includes protruding portions 515 formed on both end portions of the stator core 4201. Each of the protruding portions 515 of the yoke 510*a* includes a first protrusion 515*a* protruding in the circumferential direction of the stator core 4201, second protrusions 515*b* protruding from the first protrusion 515*a*, and third protrusions 515*c* protruding from the second protrusions 515*b*, respectively.

Each of the teeth 530*a* includes a protruding portion 535 protruding in the radial direction of the stator core 4201. The protruding portion 535 of the tooth 530*a* includes a first protrusion 535*a* protruding in the radial direction, second protrusions 535*b* protruding from the first protrusion 535*a*, and third protrusions 535*c* protruding from the second protrusions 535*b*, respectively.

Meanwhile, referring to FIG. 20, the assembly connector 5501 may be configured not to protrude from both side surfaces of the tooth 530*a*. The assembly connector 5501 of this embodiment is configured to have the same length (circumferential length) as the width of the tooth 530*a*. The assembly connector 5501 of this embodiment may be configured such that both side surfaces are disposed on extension lines of both side surfaces of the tooth 530*a*.

The assembly connector 5501 includes side protrusion accommodating spaces 555*a* to which the protruding portions 515 of the yokes 510*a* are accommodated. Each of the side protrusion accommodating spaces 555*a* includes a first protrusion accommodating space 555*a*1, second protrusion accommodating spaces 555*a*2, and third protrusion accommodating spaces 555*a*2 in which the first protrusion 515*a*, the second protrusions 515*b*, and the third protrusions 515*c* of the yoke 510*a* are accommodated.

The first protrusion accommodating space 555*a*1, the second protrusion accommodating spaces 555*a*2 and the third protrusion accommodating spaces 555*a*2 of the side protrusion accommodating space 555*a* of the assembly connector 550*a* may be configured to be smaller than the first protrusion 515*a*, the second protrusions 515*b*, and the third protrusions 515*c* of the yoke 510*a*, so as to be fitted to those protrusions with a preset interference when the protrusions are accommodated.

In this embodiment, the outer surface of the assembly connector 5501 may be configured not to protrude outward from the outer surface of the yoke 510*a*. The outer surface of the assembly connector 5501 of this embodiment may be disposed inside a circumference (shown by a dotted line) that extends from the outer surface of the yoke 510*a*.

According to this configuration, the maximum outer diameter of the stator core 4201 can be reduced, so that a compact configuration can be obtained.

The assembly connector 5501 includes an inner protrusion accommodating space 555*b* to which the protruding portion 535 of the tooth 530*a* is accommodated. The inner protrusion accommodating space 555*b* includes a first protrusion accommodating space 555*b*1, second protrusion accommodating spaces 555*b*2, and third protrusion accommodating spaces 555*b*2 in which the first protrusion 535*a*, the second protrusions 535*b*, and the third protrusions 535*c* of the yoke 530*a* are accommodated.

The first protrusion accommodating space 555*b*1, the second protrusion accommodating spaces 555*b*2 and the third protrusion accommodating spaces 555*b*2 of the inner protrusion accommodating space 555*b* of the assembly connector 5501 may be configured to be smaller than the first protrusion 535*a*, the second protrusions 535*b*, and the third protrusions 535c of the tooth 530a, so as to be fitted to those protrusions with a preset interference when the protrusions are accommodated.

With this configuration, when the tooth 530a and the assembly connector 5501 are coupled to each other, a relative movement of the first protrusion accommodating space 555b1 of the assembly connector 5501 and the first protrusion 535a of the tooth 530a in the circumferential direction of the stator core 4201 can be suppressed.

This can remarkably improve coupling force between the first protrusion 535a of the tooth 530a and the first protrusion accommodating space 555b1 of the inner protrusion accommodating space 555b of the assembly connector 5501.

With this configuration, the length of the assembly connector 5501 (the circumferential length of the stator core) can be reduced to be equal to the width of the tooth 530a.

According to this embodiment, an occurrence of displacement and deformation of the yoke 510a and the tooth 530a can be suppressed, and the width (radial width) of the assembly connector 5501 can be reduced, thereby providing a compact structure of the stator core 4201.

Hereinafter, a method of manufacturing an electric motor having the aforementioned structural features will be described with reference to the aforementioned drawings and FIG. 21.

Figure 21:
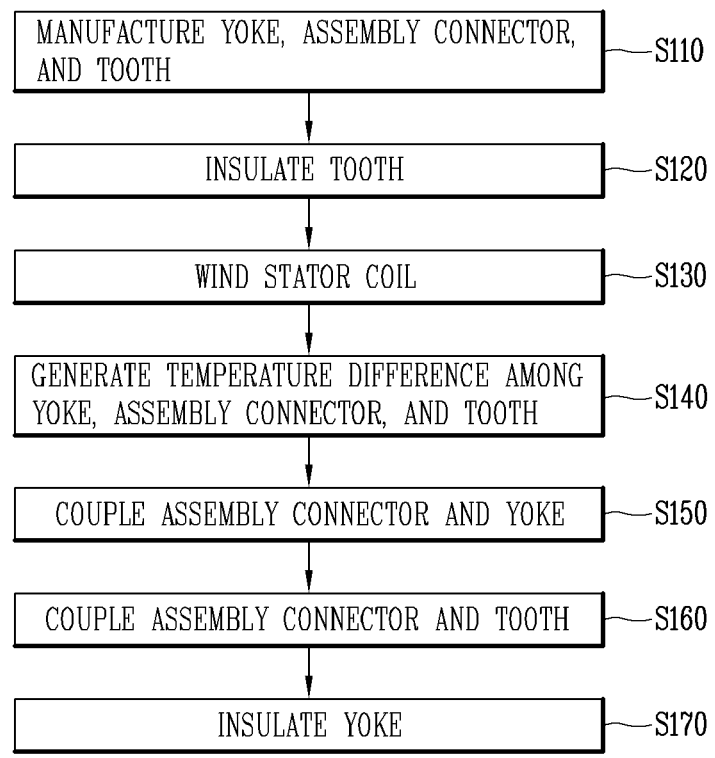
FIG. 21 is a view illustrating a method for manufacturing an electric motor in accordance with one embodiment.
Figure 22:
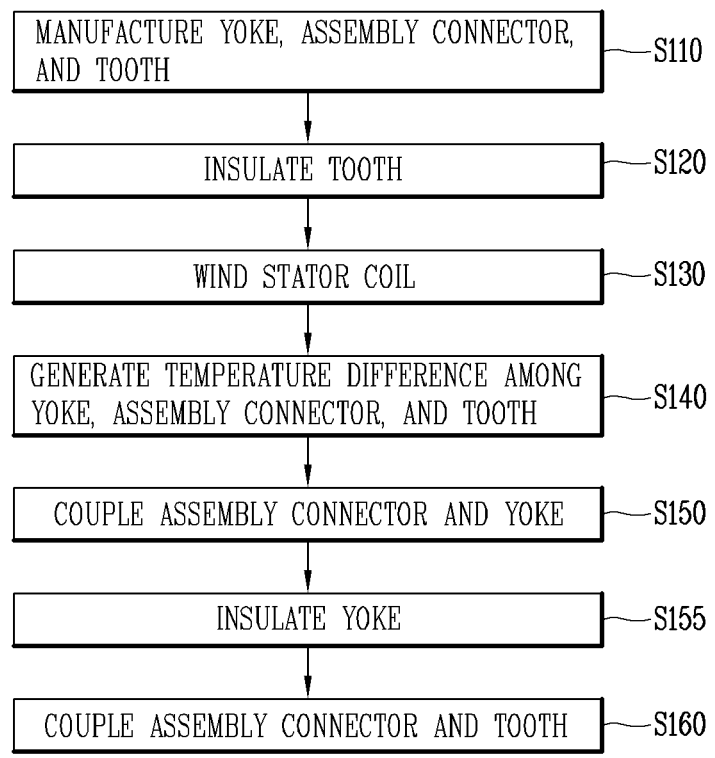
FIG. 22 is a view illustrating a method for manufacturing an electric motor in accordance with another embodiment.

FIG. 21 is a view illustrating a method for manufacturing an electric motor in accordance with one embodiment, and FIG. 22 is a view illustrating a method for manufacturing an electric motor in accordance with another embodiment. As described above, an electric motor 400 according to this embodiment includes a stator 410 and a rotor 450 that is rotatably disposed inside the stator 410 with a preset gap G therebetween.

The stator 410 may include a stator core 420 and a stator coil 425 wound around the stator core 420.

The stator 410 further includes an insulator 430 interposed between the stator core 420 and the stator coil 425 for electrical insulation between the stator core 420 and the stator coil 425.

The stator core 420 includes yokes 510 split along the circumferential direction, assembly connectors 550 each coupled between the two adjacent yokes 510, and teeth 530 each coupled to an inner surface of the assembly connector 550.

Each of the yokes 510 includes a yoke body 512 having the arcuate shape, and protruding portions formed on both end portions of the yoke body 512. Each of the protruding portions 515 of the yoke 510 includes a first protrusion 515a protruding along the circumferential direction of the stator core 420, and second protrusions 515b protruding from the first protrusion 515a along the radial direction of the stator core 420.

The tooth 530 includes a tooth body 532 formed in a "T" shape and a protruding portion 535 protruding from the tooth body 532. The protruding portion 535 of the tooth 530 includes, for example, a first protrusion 535a protruding from the tooth body 532 along the radial direction of the stator core 420, and second protrusions 535b protruding from the first protrusion 535a along the circumferential direction of the stator core 420.

The assembly connector 550 includes an assembly connector body 552 having a rectangular parallelepiped shape, and a protrusion accommodating portion 555 formed in the assembly connector body 552. The protrusion accommodating portion 555 includes side protrusion accommodating spaces 555a respectively formed in both side surfaces of the assembly connector body 552, and an inner protrusion accommodating space 555b formed in an inner surface of the assembly connector body 552.

As illustrated in FIG. 21, a method of manufacturing the electric motor according to this embodiment includes forming the yoke 510, the assembly connector 550 and the tooth 530, respectively (S110), winding the stator coil 425 on the tooth 530 (S130), coupling the yoke 510 to the assembly connector 550 (S150), and coupling the tooth 530 to the assembly connector 550 (S160).

When each of the yoke 510, the assembly connector 550, and the tooth 530 is formed, the stator coil 425 is wound around the periphery of the tooth 530 before the assembly connector 550 and the tooth 530 are coupled (S130).

The method of manufacturing the electric motor according to this embodiment may further include, before the step S130 of winding the stator coil 425 on the tooth 530, insulating the tooth 530 and the stator coil 425 from each other (S120).

The insulator 430 may be coupled to the periphery of the tooth 530 before winding the stator coil 425.

A tooth insulating portion 430a may be coupled to the periphery of the tooth 530. The tooth insulating portion 430a is configured to surround a peripheral surface (an upper surface, a lower surface, and both side surfaces in the drawing) of the tooth 530. Accordingly, the peripheral surface (upper surface, lower surface, both side surfaces) of the tooth 530 on which the stator coil 425 is wound can fully be insulated (blocked).

The stator coil 425, for example, may be wound on the periphery of the tooth insulating portion 430a to be spaced apart from the assembly connector 550 by a preset length (interval). After coupling of the yoke 510, the assembly connector 550 and the tooth 530, a gap of the preset length is generated between the yoke 510 and the stator coil 425 wound on the tooth 530.

On the other hand, the manufacturing method of the electric motor of this embodiment may further include adjusting temperatures of the yoke 510, the tooth 530, and the assembly connector 550 to cause the assembly connector 550 to have a preset temperature difference from the yoke 510 and the tooth 530 (S140), before those steps of coupling the yoke 510 to the assembly connector 550 (S150), and coupling the tooth 530 to the assembly connector 550 (S160).

Here, the step (S140) of adjusting the temperatures of the yoke 510, the tooth 530, and the assembly connector 550 may be configured such that the assembly connector 550 has a higher temperature than the yoke 510 and the tooth 530.

Specifically, the assembly connector 550 may be heated, for example, to have a temperature that is 80 degrees to 120 degrees higher than temperatures of the yoke 510 and the tooth 530.

For example, when the yoke 510 and the tooth 530 have a temperature of 25° C., the assembly connector 550 may be heated to 105° C. to 145° C.

According to this configuration, in the state in which the side protrusion accommodating spaces 555a and the inner protrusion accommodating space 555b of the assembly connector 550 have been expanded, the protruding portion 515 of the yoke 510 and the protruding portion 535 of the tooth 530 can be inserted smoothly.

In addition, since the protrusion accommodating portion 555 of the assembly connector 550 has been heated so as to have lower rigidity (strength) than the protruding portion 515 of the yoke 510 and the protruding portion 535 of the tooth 530, the deformation of the protruding portion 515 of the yoke 510 and the protruding portion 535 of the tooth 530 can be suppressed during coupling.

On the other hand, in the step S140 of adjusting the temperatures of the yoke 510, the tooth 530, and the assembly connector 550, the yoke 510 and the tooth 530 may be cooled to have temperatures lower than the temperature of the assembly connector 550.

Specifically, the yoke 510 and the tooth 530 may be cooled to have a preset temperature difference (e.g., about 70° C.) compared to the assembly connector 550.

For example, when the temperature of the assembly connector 550 is 25° C., the yoke 510 and the teeth 530 may be cooled down to −45° C.

According to this configuration, the protruding portion 515 of the yoke 510 and the protruding portion 535 of the tooth 530 can be cooled and contracted, so as to be smoothly inserted into the protruding accommodating portion 555 of the assembly connector 550.

The method of manufacturing the electric motor of this embodiment may further include insulating the yoke 510 (S170).

The step S170 of insulating the yoke 510 may be performed after the step S160 of coupling the assembly connector 550 and the tooth 530.

The insulator 430 may include, for example, a yoke insulating portion 430b coupled to the yoke 510 for insulation between the yoke 510 and the stator coil 425. Specifically, the yoke insulating portion 430b of the insulator 430 may be coupled to the upper surface, the lower surface, and the inner surface of the yoke 510.

Here, as illustrated in FIG. 21, the step S155 of insulating the yoke 510 may be performed before the step S160 of coupling the assembly connector 550 and the tooth 530.

So far, those specific embodiments of the present disclosure have been illustrated and described. However, since the present disclosure can be embodied in various forms without departing from the essential characteristics, the embodiments described above should not be limited by the specific contents for carrying out the invention.

In addition, even embodiments not listed in the foregoing detailed description should be broadly construed within the scope of the technical idea defined in the appended claims. And, all changes and modifications included within the technical range of the claims and their equivalents should be embraced by the appended claims.

The invention claimed is:

1. An electric motor comprising:
a stator, the stator comprising a stator core and a stator coil wound around the stator core; and
a rotor configured to rotate relative to the stator,
wherein the stator core comprises:
a plurality of yokes that are split in a circumferential direction of the stator core, each of the plurality of yokes comprising a protruding portion,
a plurality of assembly connectors that connect the plurality of yokes to one another, each of the plurality of assembly connectors comprising a protrusion accommodating portion that accommodates the protruding portion and couples two adjacent yokes among the plurality of yokes to each other along the circumferential direction, and
a plurality of teeth, each tooth protruding from an inner surface of one of the plurality of assembly connectors in a radial direction of the stator core,
wherein an outer surface defined by the plurality of assembly connectors protrudes radially outward relative to an outer surface defined by the plurality of yokes,
wherein each of the plurality of teeth comprises a tooth protruding portion,
wherein each of the plurality of assembly connectors further comprises a tooth protrusion accommodating portion that accommodates the tooth protruding portion, the tooth protrusion accommodating portion being an opening defined at the inner surface of each of the plurality of assembly connectors,
wherein a circumferential width of each of the plurality of assembly connectors is greater than a circumferential width of each of the plurality of teeth in the circumferential direction,
wherein each of the plurality of teeth comprises extension portions that are in contact with the inner surfaces of one of the plurality of assembly connectors, the extension portions extending from sides of an outer end portion of one of the plurality of teeth in the circumferential direction and being in contact with the inner surfaces of the one of the plurality of assembly connectors, and
wherein a maximum width of the extension portions corresponds to the circumferential width of each of the plurality of assembly connectors.

2. The electric motor of claim 1, wherein each of the plurality of yokes and each of the plurality of teeth are fitted to one of the plurality of assembly connectors.

3. The electric motor of claim 1, wherein the plurality of assembly connectors are made of a magnetic material.

4. The electric motor of claim 1, wherein the plurality of assembly connectors comprise a plurality of electrical steel sheets that are stacked and insulated from one another.

5. The electric motor of claim 1, wherein the plurality of assembly connectors are coupled to the plurality of yokes and the plurality of teeth based on (i) a first temperature of the plurality of assembly connectors being greater than a second temperature of the plurality of yokes and the plurality of teeth, and (ii) a difference between the first temperature and the second temperature being equal to a preset temperature difference.

6. The electric motor of claim 1, wherein the stator further comprises an insulator that insulates the stator core from the stator coil.

7. The electric motor of claim 1, wherein the protruding portion comprises:
a first protrusion that protrudes in the circumferential direction; and
second protrusions that protrude from the first protrusion in the radial direction.

8. The electric motor of claim 7, wherein a first circumference of the stator core passing through a center of the first protrusion is disposed radially outward relative to a second circumference of the stator core passing through centers of the plurality of yokes.

9. The electric motor of claim 8, wherein the protrusion accommodating portion comprises:
a first protrusion accommodating space that accommodates the first protrusion; and
second protrusion accommodating spaces that accommodate the second protrusions, respectively, and
wherein a distance between one of the second protrusion accommodating spaces and an outer surface of one of the plurality of assembly connectors is larger than a radial protrusion length of one of the second protrusions.

10. The electric motor of claim 7, wherein the protruding portion further comprises third protrusions that protrude from the second protrusions, respectively, in the circumferential direction.

11. An electric motor comprising:
a stator, the stator comprising a stator core and a stator coil wound around the stator core; and
a rotor configured to rotate relative to the stator,
wherein the stator core comprises:
    a plurality of yokes that are split in a circumferential direction of the stator core,
    a plurality of assembly connectors that connect the plurality of yokes to one another, each of the plurality of assembly connectors coupling two adjacent yokes among the plurality of yokes to each other along the circumferential direction, and
    a plurality of teeth, each tooth protruding from an inner surface of one of the plurality of assembly connectors in a radial direction of the stator core,
wherein each of the plurality of teeth comprises a tooth protruding portion toward one of the plurality of assembly connectors,
wherein each of the plurality of assembly connectors comprises a tooth protrusion accommodating portion that accommodates the tooth protruding portion, the tooth protrusion accommodating portion being an opening defined at the inner surface of each of the plurality of assembly connectors,
wherein a circumferential width of each of the plurality of assembly connectors is greater than a circumferential width of each of the plurality of teeth in the circumferential direction,
wherein each of the plurality of teeth comprises extension portions that are in contact with the inner surfaces of one of the plurality of assembly connectors, the extension portions extending from sides of an outer end portion of one of the plurality of teeth in the circumferential direction and being in contact with the inner surfaces of the one of the plurality of assembly connectors, and
wherein a maximum width of the extension portions corresponds to the circumferential width of each of the plurality of assembly connectors.

12. The electric motor of claim 1, wherein the inner surfaces of the one of the plurality of assembly connectors are inner circumferential surfaces of the one of the plurality of assembly connectors, and
wherein the extension portions of each of the plurality of teeth are in contact with and coupled to the inner circumferential surfaces of the one of the plurality of assembly connectors in the radial direction.

13. The electric motor of claim 11, wherein the inner surfaces of the one of the plurality of assembly connectors are inner circumferential surfaces of the one of the plurality of assembly connectors, and
wherein the extension portions of each of the plurality of teeth are in contact with and coupled to the inner circumferential surfaces of the one of the plurality of assembly connectors in the radial direction.

* * * * *